(12) United States Patent
Lin et al.

(10) Patent No.: US 12,707,037 B2
(45) Date of Patent: Aug. 11, 2026

(54) TEMPLATE MATCHING PATTERNS AND FUSION FOR TEMPLATE MATCHING RELATED VIDEO CODING

(71) Applicant: QUALCOMM Incorporated, San Diego, CA (US)

(72) Inventors: Po-Han Lin, Taipei (TW); Jian-Liang Lin, Su'ao Township (TW); Bappaditya Ray, San Diego, CA (US); Yao-Jen Chang, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 18/442,740

(22) Filed: Feb. 15, 2024

(65) Prior Publication Data

US 2024/0297981 A1 Sep. 5, 2024

Related U.S. Application Data

(60) Provisional application No. 63/488,131, filed on Mar. 2, 2023.

(51) Int. Cl.

| | |
|---|---|
| ***H04N 19/105*** | (2014.01) |
| ***H04N 19/147*** | (2014.01) |
| ***H04N 19/176*** | (2014.01) |

(52) U.S. Cl.

CPC ......... *H04N 19/105* (2014.11); *H04N 19/147* (2014.11); *H04N 19/176* (2014.11)

(58) Field of Classification Search

None

See application file for complete search history.

(56) References Cited

U.S. PATENT DOCUMENTS

| | | | | |
|---|---|---|---|---|
| 2019/0253722 | A1* | 8/2019 | Panusopone | H04N 19/70 |
| 2022/0239899 | A1* | 7/2022 | Zhang | H04N 19/46 |
| 2023/0345023 | A1* | 10/2023 | Chen | H04N 19/44 |
| 2024/0155109 | A1* | 5/2024 | Deng | H04N 19/159 |
| 2024/0364904 | A1* | 10/2024 | Kang | H04N 19/44 |
| 2024/0406434 | A1* | 12/2024 | Laroche | H04N 19/139 |

(Continued)

FOREIGN PATENT DOCUMENTS

WO 2023020589 A1 2/2023

OTHER PUBLICATIONS

Chen Y., et al., "Description of SDR, HDR and 360° Video Coding Technology Proposal by Qualcomm and Technicolor—Low and High Complexity Versions", 10th JVET Meeting, Apr. 10, 2018-Apr. 20, 2018, San Diego, (The Joint Video Exploration Team of ISO/IEC JTC1/SC29/WG11 and ITU-T SG.16 ), No. JVET-J0021, Apr. 14, 2018, pp. 1-42, XP030248216.

(Continued)

*Primary Examiner* — Chikaodili E Anyikire

(74) *Attorney, Agent, or Firm* — Shumaker & Sieffert, P. A.

(57) ABSTRACT

A method of encoding or decoding video data includes constructing a template matching candidate list for a current block of the video data based on a plurality of template patterns; and encoding or decoding the current block based on the template matching candidate list.

19 Claims, 16 Drawing Sheets

(56) References Cited

U.S. PATENT DOCUMENTS

| | | | | |
|---|---|---|---|---|
| 2025/0039364 | A1* | 1/2025 | Wang | H04N 19/105 |
| 2025/0343900 | A1* | 11/2025 | Ma | H04N 19/105 |
| 2025/0373796 | A1* | 12/2025 | Deng | H04N 19/105 |

OTHER PUBLICATIONS

Esenlik (Huawei) S., et al., "Description of Core Experiment 9 (CE9): Decoder Side Motion Vector Derivation", JVET-J1029_r1, 10 JVET Meeting, Apr. 10, 2018-Apr. 20, 2018, San Diego, (The Joint Video Exploration Team of ISO/IEC JTC1/SC29/WG11 and ITU-T SG.16 ), No. JVET-J1029, Apr. 27, 2018, XP030248310, pp. 1-35.
International Search Report and Written Opinion—PCT/US2024/016248—ISA/EPO—Jun. 11, 2024 (14 pp).
Lin P-H (Qualcomm Incorporated)., et al., "Non-EE2: IntraTMP with Multiple Modes", JVET-AC0198-v3, 29th JVET Meeting, Jan. 11, 2023-Jan. 20, 2023, by Teleconference, Joint Video Experts Team (JVET) of ITU-T SG 16 WP 3 and ISO/IEC JTC 1/SC 29, No. JVET-AC0198, m61781, Jan. 13, 2023, XP030306891, pp. 1-3, The Whole Document.
Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334, cited in the application section 9.3.3.2.
Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.
Chen J., et al., "Algorithm Description for Versatile Video Coding and Test Model 4 (VTM 4)", 13th JVET Meeting, Jan. 9, 2019-Jan. 18, 2019, Marrakech, (The Joint Video Exploration Team of ISO/IEC JTC1/SC29/WG11 and ITU-T SG.16 WP3), No. JVET-M1002-v2, Mar. 19, 2019, No. m46628, XP030255391, XP030215567, pp. 1-62, section 2, 3.7, figure 1.
Chen Y-W., et al., "Description of 360° Video Coding Technology Proposal by Qualcomm and Technicolor—Low and High Complexity Versions", JVET-J0021, JVET-F0025, JVET-G0058, Apr. 14, 2018, 4 Pages.
Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54, Section 3.8 with sub-sections.
Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.
Fan Z., et al., "EE2-1.11c: Combination of EE2-1.7, EE2-1.8, EE2-1.9, and EE2-1.10", JVET-AC0046-v3, Joint Video Experts Team (JVET) of ITU-T SG 16 WP 3 and ISO/IEC JTC 1/SC 29 29th Meeting, by Teleconference, Jan. 11-20, 2023, pp. 1-3.
Huang H., et al., "EE2-1.15: Enhancements on CCP Merge for Chroma Intra Coding", JVET-AG0059-v2, Joint Video Experts Team (JVET) of ITU-T SG 16 WP 3 and ISO/IEC JTC 1/SC 29 33rd Meeting, by Teleconference, Jan. 17-26, 2024, pp. 1-4.
Huo J., et al., "EE2-1.15a: Intra Template Matching (Intra TMP) Based on Linear Filter Model", Xidian University, JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.
Huo J., et al., "EE2-1.16: A Fusion method of Intra Template Matching Prediction(Intra TMP)", Xidian University, JVET-AD0116-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Li X., et al., "EE2-1.12: Intra TMP with sub-pel Precision", Alibaba group, JVET-AD0125-v1, Joint Video Experts Team (JVET) of ITU-T SG 16 WP 3 and ISO/IEC JTC 1/SC 29 30th Meeting, Antalya, TR, Apr. 21-28, 2023, pp. 1-3.
Li X., et al., "EE2-1.2: On Chroma Intra Prediction", JVET-Z0051-v1, Joint Video Experts Team (JVET) of ITU-T SG 16 WP 3 and ISO/IEC JTC 1/SC 29, 26th Meeting, by Teleconference, Apr. 20-29, 2022, pp. 1-6.
Lin P-H., et al., "EE2-1.19: IntraTMP with Multiple Modes", Qualcomm Incorporated, JVET-AD0194-v2, Joint Video Experts Team (JVET) of ITU-T SG 16 WP 3 and ISO/IEC JTC 1/SC 29 30th Meeting: Antalya, TR, Apr. 21-28, 2023, pp. 1-6.
Ma Y., et al., "EE2-1.14c Combination Test of EE2-1.14a and EE2-1.14b", Xidian University, JVET-AD0075-v2, Joint Video Experts Team (JVET) of ITU-T SG 16 WP 3 and ISO/IEC JTC 1/SC 29 30th Meeting, Antalya, TR, Apr. 21-28, 2023, pp. 1-2.
Reuze K., et al., "EE2-1.10: Optimizing the use of Reference Samples", JVET-AC0094-v2, Joint Video Experts Team (JVET) of ITU-T SG 16 WP 3 and ISO/IEC JTC 1/SC 29 29th Meeting, by Teleconference, Jan. 11-20, 2023, pp. 1-4.
Seregin V., et al., "Exploration Experiment on Enhanced Compression Beyond VVC Capability (EE2)", Joint Video Experts Team (JVET) of ITU-T Sg 16 WP 3 and iso/iec jtc 1/SC 29, JVET-AC2024-v2, 29th Meeting, by teleconference, Jan. 11-20, 2023, pp. 1-30.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.
Wang F., et al., "EE2-1.20i/j: Combination of IntraTMP Tests", OPPO, JVET-AD0086-v4, Joint Video Experts Team (JVET) of ITU-T SG 16 WP 3 and ISO/IEC JTC 1/SC 29 30th Meeting, Antalya, TR, Apr. 21-28, 2023, pp. 1-5.
Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages. Please consider section 8.5.3.2.6 on p. 125, section 8.5.3.2.7 on pp. 126-129, and section 8.5.3.2.8 on pp. 129 and 130, XP002787691, p. 89-94.
Xu L., et al., "EE2-1.14: An Extrapolation Filter-based Intra Prediction Mode", JVET-AG0058-v2, Joint Video Experts Team (JVET) of ITU-T SG 16 WP 3 and ISO/IEC JTC 1/SC 29 33rd Meeting, by Teleconference, Jan. 17-26, 2024, pp. 1-6.
Youvalari R.G., et al., "EE2-1.12: Gradient and Location Based Convolutional Cross-component Model (GL-CCCM) for Intra Prediction", JVET-AC0054-v2, Joint Video Experts Team (JVET) of ITU-T SG 16 WP 3 and ISO/IEC JTC 1/SC 29 29th Meeting, by teleconference, Jan. 11-20, 2023, pp. 1-6.
Zhang L., et al., "EE2-1.11: Intra Template Matching Prediction Fusion", JVET-AD0072-v2, Joint Video Experts Team (JVET) of ITU-T SG 16 WP 3 and ISO/IEC JTC 1/SC 29, 30th Meeting, Apr. 21, 2023-Apr. 28, 2023, Antalya, TR, Apr. 17, 2023, pp. 1-5, XP030308662.
Zhang L., et al., "EE2-1.19: IBC-LIC Model Merge Mode", JVET-AG0060-v1, Joint Video Experts Team (JVET) of ITU-T SG 16 WP 3 and ISO/IEC JTC 1/SC 29 33rd Meeting, by Teleconference, Jan. 17-26, 2024, pp. 1-3.
Wang F., et al., "EE2-1.10 Multi-Candidate IntraTMP", OPPO, JVET-AD0073-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

* cited by examiner

Figure 15:
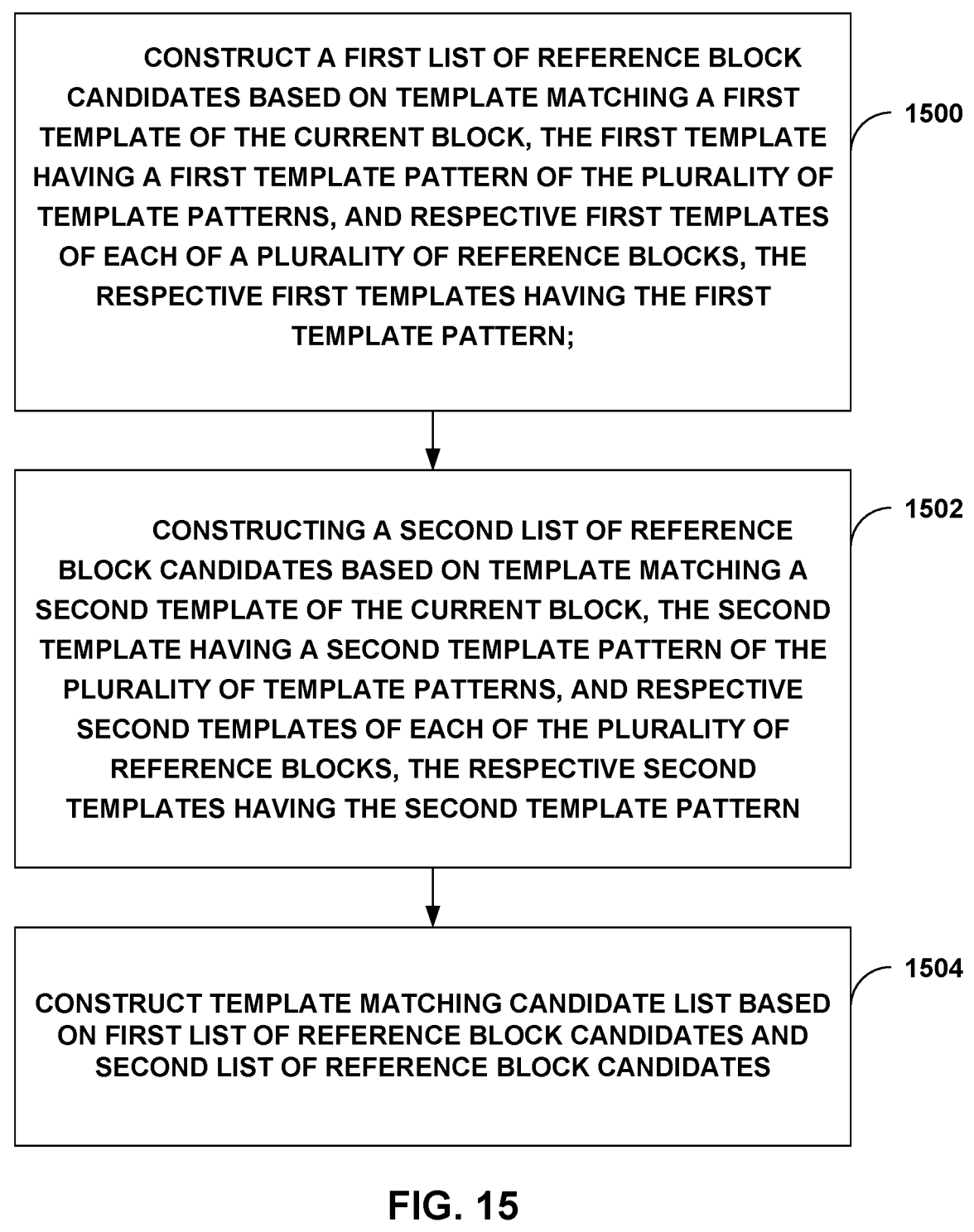

CONSTRUCT A FIRST LIST OF REFERENCE BLOCK CANDIDATES BASED ON TEMPLATE MATCHING A FIRST TEMPLATE OF THE CURRENT BLOCK, THE FIRST TEMPLATE HAVING A FIRST TEMPLATE PATTERN OF THE PLURALITY OF TEMPLATE PATTERNS, AND RESPECTIVE FIRST TEMPLATES OF EACH OF A PLURALITY OF REFERENCE BLOCKS, THE RESPECTIVE FIRST TEMPLATES HAVING THE FIRST TEMPLATE PATTERN;

1500

CONSTRUCTING A SECOND LIST OF REFERENCE BLOCK CANDIDATES BASED ON TEMPLATE MATCHING A SECOND TEMPLATE OF THE CURRENT BLOCK, THE SECOND TEMPLATE HAVING A SECOND TEMPLATE PATTERN OF THE PLURALITY OF TEMPLATE PATTERNS, AND RESPECTIVE SECOND TEMPLATES OF EACH OF THE PLURALITY OF REFERENCE BLOCKS, THE RESPECTIVE SECOND TEMPLATES HAVING THE SECOND TEMPLATE PATTERN

1502

CONSTRUCT TEMPLATE MATCHING CANDIDATE LIST BASED ON FIRST LIST OF REFERENCE BLOCK CANDIDATES AND SECOND LIST OF REFERENCE BLOCK CANDIDATES

TEMPLATE MATCHING PATTERNS AND FUSION FOR TEMPLATE MATCHING RELATED VIDEO CODING

This application claims benefit of U.S. Provisional Application No. 63/488,131, filed Mar. 2, 2023, the entire contents of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for extending the available templates for template matching based video coding techniques. For instance, rather than including one template and process for template matching, a video coder (e.g., video encoder or video decoder) may store a plurality of template candidates. Rather than performing template matching techniques using only one template pattern, the video coder may be configured to perform template matching techniques using a plurality of template patterns. The video coder may generate a prediction block based on the results of performing template matching techniques using the plurality of template patterns, including selecting reference blocks based on the template matching techniques and fusing the reference blocks to generate the prediction block.

Accordingly, the example techniques allow for utilizing a plurality of template patterns for generating a prediction block for a current block. This prediction block may better predict the current block than other techniques, resulting is less residual information that is signaled, which promotes bandwidth efficiency. In this manner, the example techniques may provide a practical application for template matching in video coding techniques that improves the overall performance of video coding.

In one example, the disclosure describes a method of encoding or decoding video data, the method comprising: constructing a template matching candidate list for a current block of the video data based on a plurality of template patterns; and encoding or decoding the current block based on the template matching candidate list.

In one example, the disclosure describes a device for encoding or decoding video data, the device comprising: one or more memories configured to store the video data; and processing circuitry coupled to the one or more memories, wherein the processing circuitry is configured to: construct a template matching candidate list for a current block of the video data based on a plurality of template patterns; and encode or decode the current block based on the template matching candidate list.

In one example, the disclosure describes a computer-readable storage medium storing instructions thereon that when executed cause one or more processors to: construct a template matching candidate list for a current block of video data based on a plurality of template patterns; and encode or decode the current block based on the template matching candidate list.

In one example, the disclosure describes a device for encoding or decoding video data, the device comprising: means for constructing a template matching candidate list for a current block of the video data based on a plurality of template patterns; and means for encoding or decoding the current block based on the template matching candidate list.

The details of one or more examples are set forth in the accompanying drawings and the description below. Other features, objects, and advantages will be apparent from the description, drawings, and claims.

BRIEF DESCRIPTION OF DRAWINGS

FIG. 15 is another flowchart illustrating an example method of operation in accordance with one or more examples described in this disclosure.

DETAILED DESCRIPTION

Figure 1:
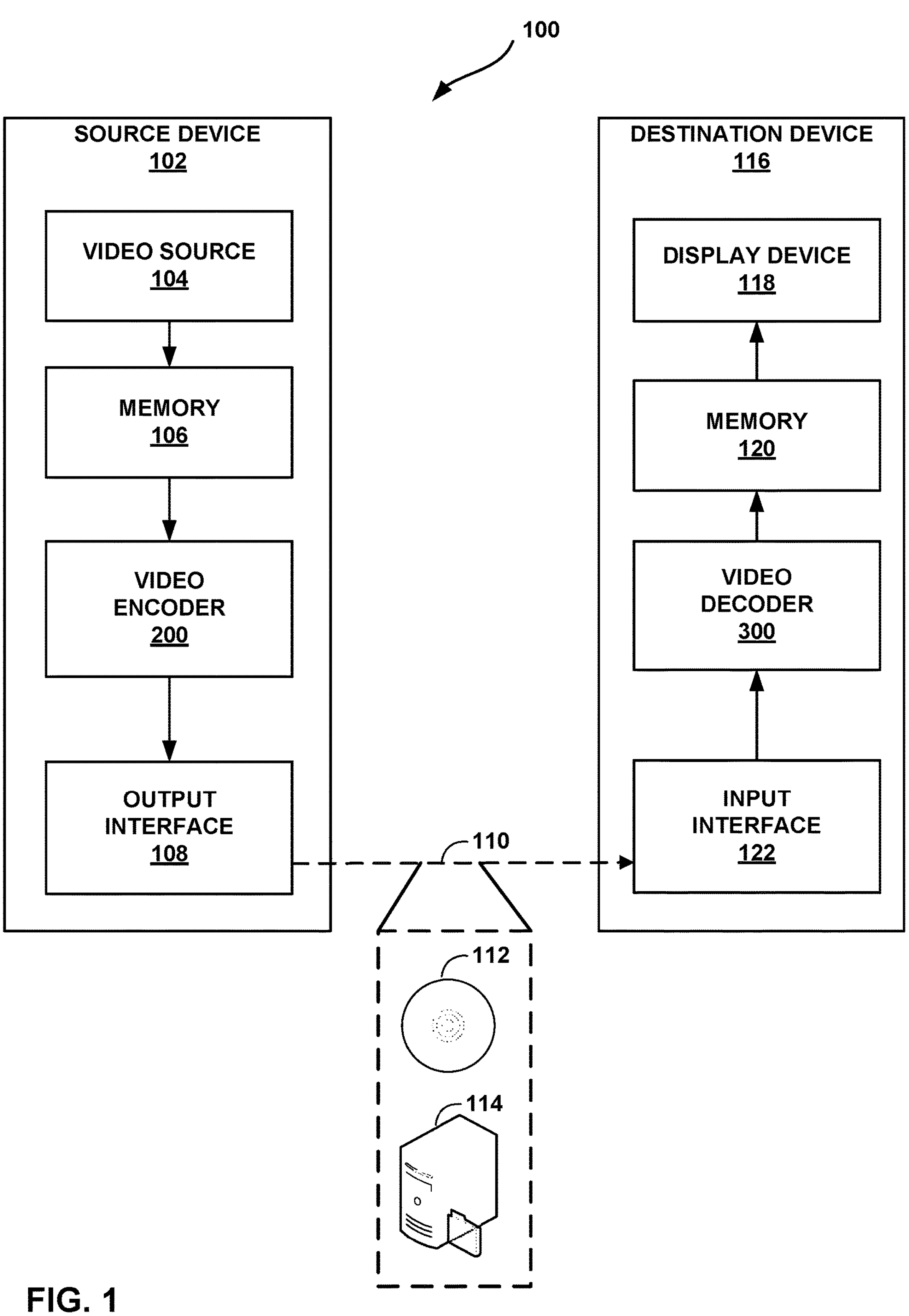
FIG. 1 is a block diagram illustrating an example video encoding and decoding system that may perform the techniques of this disclosure.

Template matching is a video coding tool used for various purposes. In template matching, a video encoder and a video decoder each determine samples within a template pattern (or simply template) based on previously encoded or decoded samples. The template pattern may have various shapes, like an L shape of samples, or may be a row or column of samples. For template matching, the video encoder and the video decoder compare different templates (e.g., in different pictures or the same picture) together for purposes like updating a prediction block, refining a motion vector, rearranging merge list, etc.

In some example techniques, there may be a limit to how many template patterns are available (e.g., only one template pattern). The limit on the number of available template patterns may result in sub-optimal use of template matching techniques. In one or more examples, a video encoder and a video decoder may each utilize a plurality of template patterns (e.g., template pattern set) for encoding or decoding a current block.

As one example, the video encoder or video decoder may construct a template matching candidate list for a current block of the video data based on a plurality of template patterns. The template matching candidate list may include reference block candidates (e.g., coordinate information of a reference block candidate or vector information for a vector that points to the reference block candidate), and in some examples, arranged based on respective template matching cost values of the reference blocks. In one or more examples, in determining the template matching cost values, the video encoder and the video decoder may utilize the plurality of template patterns.

For example, the video encoder and the video decoder may construct a first list of reference block candidates based on template matching a first template, having a first template pattern of the plurality of template patterns, of the current block and respective first templates, having the first template pattern, of each of a plurality of reference blocks. The video encoder and the video decoder may construct a second list of reference block candidates based on template matching a second template, having a second template pattern of the plurality of template patterns, of the current block and respective second templates, having the second template pattern, of each of the plurality of reference blocks.

Stated another way, the video encoder and the video decoder may construct a first list of reference block candidates based on template matching a first template of the current block, the first template having a first template pattern of the plurality of template patterns, and respective first templates of each of a plurality of reference blocks, the respective first templates having the first template pattern. The video encoder and the video decoder may construct a second list of reference block candidates based on template matching a second template of the current block, the second template having a second template pattern of the plurality of template patterns, and respective second templates of each of the plurality of reference blocks, the respective second templates having the second template pattern. The video encoder and the video decoder may construct the template matching candidate list based on the first list of reference block candidates and the second list of reference block candidates.

The video encoder and the video decoder may construct the template matching candidate list based on the first list of reference block candidates and the second list of reference block candidates. In some examples, there may be third template pattern, or more template patterns. The video encoder and the video decoder may construct respective lists of reference block candidates, and perform some combining technique of the first, second, third, and possibly additional lists of reference block candidates to generate the template matching candidate list. For instance, the video encoder and the video decoder may perform pruning to ensure that the template matching candidate list does not include multiple instances of the same reference block candidate.

In one or more examples, the video encoder may signal and the video decoder may receive an index into the template matching candidate list, and the video decoder may determine the reference block that is identified by the index. In some examples, the video decoder may set the determined reference block as a prediction block for the current block. However, in some examples, the video decoder may determine a plurality of reference blocks from the template matching candidate list (e.g., based on received indices or some other techniques). The video decoder may fuse (e.g., weighted average) the plurality of reference blocks to generate the prediction block.

The video encoder may signal and the video decoder may receive residual information indicative of a difference between the current block and the prediction block. The video decoder may reconstruct the current block based on the residual information and the prediction block.

As described in more detail, there may be various ways in which to perform template matching. For instance, the video encoder and the video decoder may perform the template matching based on the template patterns such as intra-template matching for intra-prediction of the current block, inter-template matching for inter-prediction of the current block based on the template patterns, adaptive reordering of merge candidates with template matching for inter-prediction of the current block based on the template patterns, or intra-block copy template matching for inter-block prediction of the current block based on the template patterns.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template matching patterns and fusion for template matching related video coding.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for template matching patterns and fusion for template matching related video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee TM), a Bluetooth TM standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching patterns and fusion for template matching related video coding. For example, the example techniques include utilizing additional template patterns that can be used for template matching techniques, which may provide efficiency and better coding gains.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure is related to defining different methods (e.g., template type, fusion) and syntax using in the template matching (TM) related tools. The disclosed methods can be applied to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from http://phenix.int-evry.fr/jct/doc_end_user/documents/14_Vienna/wg11/JCTVC-N1003-v1.zip ITU-T VCEG (Q6/16) and ISO/IEC MPEG (JTC 1/SC 29/WG 11) further developed the versatile video coding (VVC) standard. The latest version of reference software, i.e., VVC Test Model 10 (VTM 10) could be downloaded from: https://vcgit.hhi.fraunhofer.de/jvet/VVCSoftware_VTM. The Versatile Video Coding (VVC) draft specification could be referred to JVET-T2001. Algorithm description of Versatile Video Coding and Test Model 10 (VTM 10.0) could be referred to JVET-T2002.

The following describes intra template matching. Intra template matching prediction (Intra TMP) is a special intra prediction mode that copies the best prediction block from the reconstructed part of the current frame, whose L-shaped template matches the current template. For a predefined search range, video encoder 200 searches for the most similar template to the current template in a reconstructed part of the current frame and uses the corresponding block as a prediction block. The video encoder 200 then signals the usage of this mode, and the same prediction operation is performed at the decoder side by video decoder 300.

Figure 6:
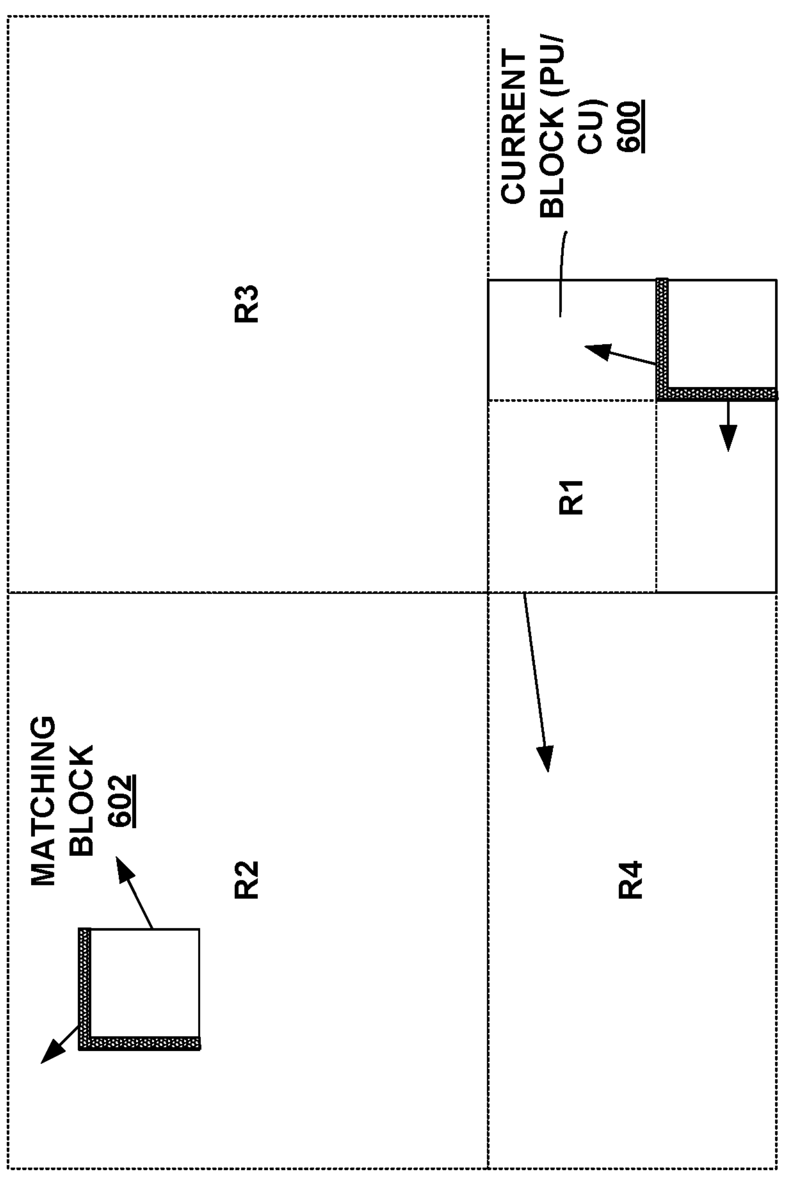
FIG. 6 is a conceptual diagram illustrating an example of intra template matching search area that is used.

The prediction signal is generated by matching the L-shaped causal neighbor of the current block with another block in a predefined search area in FIG. 6 that illustrates current block 600 and matching block 602. The search area includes: R1: current CTU, R2: top-left CTU, R3: above CTU, and R4: left CTU. Sum of absolute differences (SAD) is used as a cost function.

Within each region, video decoder 300 searches for the template that has least SAD with respect to the current one and uses its corresponding block as a prediction block. The dimensions of all regions (SearchRange_w, SearchRange_h) are set proportional to the block dimension (BlkW, BlkH) to have a fixed number of SAD comparisons per pixel. That is:

$$\text{SearchRange\_w} = a * BlkW$$

$$\text{SearchRange\_h} = a * BlkH$$

Where 'a' is a constant that controls the gain/complexity trade-off. In practice, 'a' is equal to 5.

The Intra template matching tool is enabled for CUs with size less than or equal to 64 in width and height. This maximum CU size for Intra template matching is configurable. The Intra template matching prediction mode is signaled at CU level through a dedicated flag when DIMD (decode side intra-mode derivation) is not used for current CU.

Figure 7:
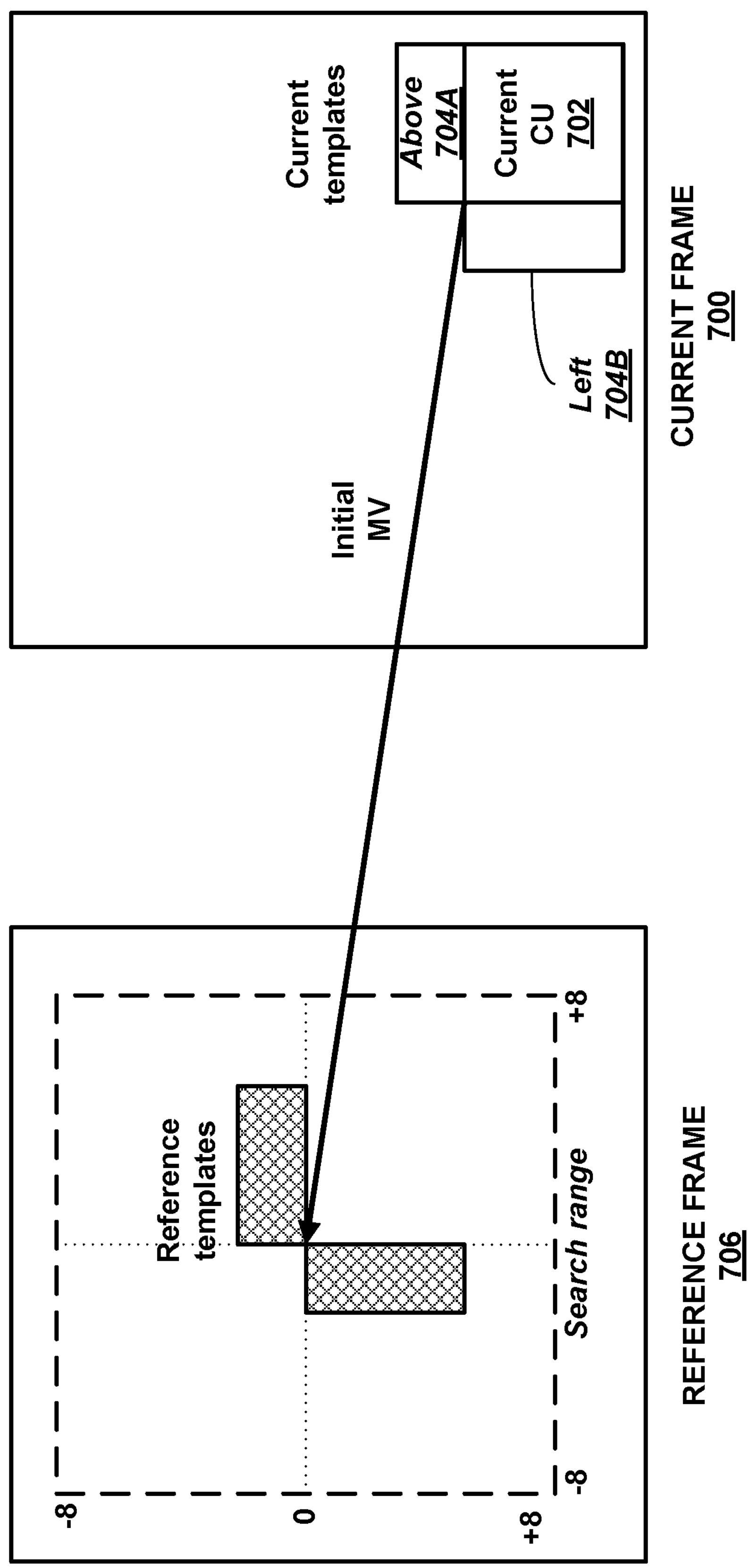
FIG. 7 is a conceptual diagram illustrating an example of template matching on a search area around an initial motion vector (MV).

The following describes inter template matching. Inter template matching (Inter TM) is a decoder-side MV derivation method to refine the motion information of the current CU by finding the closest match between a template (e.g., top and/or left neighboring blocks of the current CU) in the current picture and a block (i.e., same size to the template) in a reference picture. As illustrated in FIG. 7, video encoder 200 and video decoder 300 may search a better MV around the initial motion of the current CU 702 of current frame 700 within a [−8, +8]-pel search range. The template matching is performed with above template 704A and left template 704B with reference templates in reference frame 706. The template matching method in JVET-J0021: "Description of SDR, HDR and 360° video coding technology proposal by Qualcomm and Technicolor—low and high complexity versions" by Chen et al. Joint Video Exploration Team (JVET) of ITU-T SG 16 WP 3 and ISO/IEC JTC 1/SC 29/WG 11 10$^{th}$ meeting: San Diego, US 10-20 Apr. 2018 is used with the following modifications: search step size is determined based on AMVR (adaptive motion vector resolution) mode and InterTM can be cascaded with bilateral matching process in merge modes.

In AMVP (advance motion vector predictor) mode, an MVP (motion vector predictor) candidate is determined based on template matching error to select the one which reaches the minimum difference between the current block template and the reference block template, and then InterTM is performed only for this particular MVP candidate for MV refinement. InterTM refines this MVP candidate, starting from full-pel MVD (motion vector difference) precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR.

| Search | AMVR mode | | | | Merge mode | |
|---|---|---|---|---|---|---|
| pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In merge mode, similar search method is applied to the merge candidate indicated by the merge index. InterTM may be performed all the way down to ⅛-pel MVD precision or skipping those beyond half-pel MVD precision, depending on whether the alternative interpolation filter (that is used when AMVR is of half-pel mode) is used according to merged motion information. In some examples, when TM mode is enabled, video encoder 200 and video decoder 300 may perform template matching as an independent process or an extra MV refinement process between block-based and subblock-based bilateral matching (BM) methods, depending on whether BM can be enabled or not according to its enabling condition check.

The following describes adaptive reordering of merge candidates with template matching (ARMC-TM). The merge candidates are adaptively reordered with template matching (TM). The reordering method is applied to regular merge mode, TM merge mode, and affine merge mode (excluding the SbTMVP candidate). For the TM merge mode, merge candidates are reordered before the refinement process.

Video encoder 200 and video decoder 300 may construct an initial merge candidate list according to a given checking order, such as spatial, TMVPs (temporal motion vector predictors), non-adjacent, HMVPs (history-based motion vector predictors), pairwise, and virtual merge candidates. Then the candidates in the initial list are divided into several subgroups. For the template matching (TM) merge mode, adaptive DMVR (decoder-side motion vector refinement) mode, each merge candidate in the initial list is firstly refined by using TM/multi-pass DMVR. Merge candidates in each subgroup are reordered to generate a reordered merge candidate list and the reordering is according to cost values based on template matching. The index of selected merge candidate in the reordered merge candidate list is signaled to video decoder 300. For simplification, in some examples, merge candidates in the last but not the first subgroup are not reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

Figure 8:
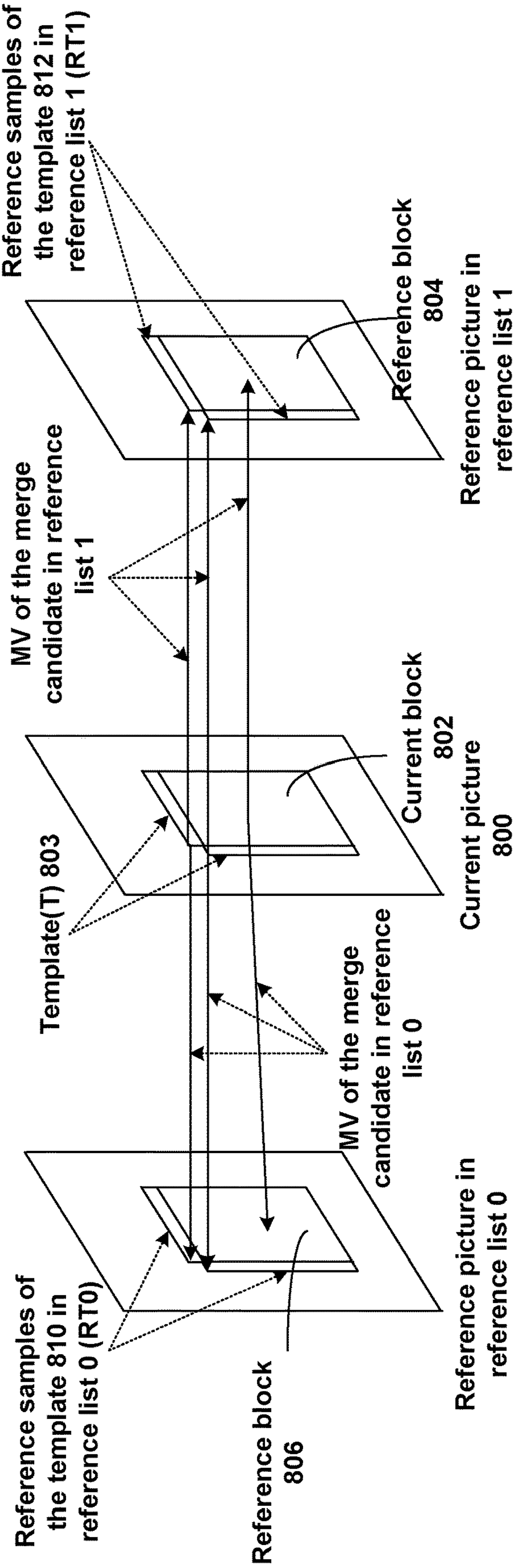
FIG. 8 is a conceptual diagram illustrating an example of template and reference samples of a template in reference pictures.

The following describes the cost calculation. The template matching cost of a merge candidate during the reordering process is measured by the SAD between samples of a template of the current block and their corresponding reference samples. The template comprises a set of reconstructed samples neighboring to the current block. Reference samples of the template are located by the motion information of the merge candidate. When a merge candidate utilizes bi-directional prediction, the reference samples of the template of the merge candidate are also generated by bi-prediction as shown in FIG. 8. For instance, FIG. 8 illustrates current picture 800 with current block 802 and template 803. Reference block 806 is around reference samples of template 810 and reference block 804 is around reference samples of template 812.

The following describes refinement of the initial merge candidate list. When multi-pass DMVR is used to derive the refined motion to the initial merge candidate list only the first pass (i.e., PU level) of multi-pass DMVR is applied in reordering. When template matching is used to derive the refined motion, the template size is set equal to 1. In some techniques, only the above or left template is used during the motion refinement of TM when the block is flat with block width greater than 2 times of height or narrow with height greater than 2 times of width. TM is extended to perform 1/16-pel MVD precision. The first four merge candidates are reordered with the refined motion in TM merge mode.

Figure 9:
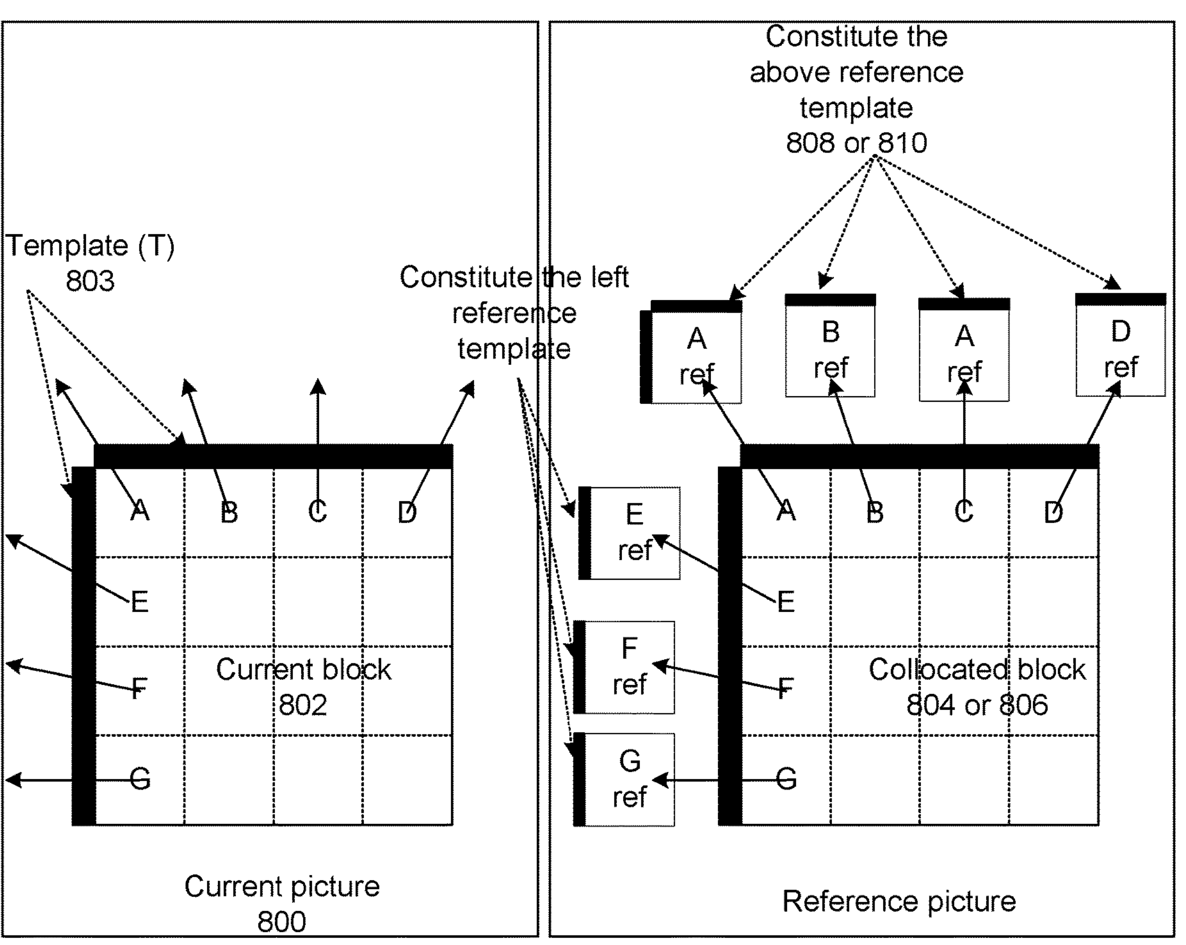
FIG. 9 is a conceptual diagram illustrating an example of template and reference samples for the template for block with sub-block motion using motion information of the sub-blocks of the current block.
Figure 10A:
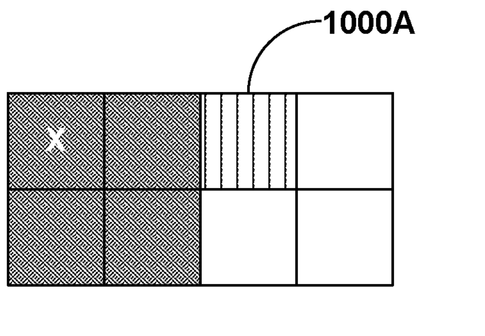
FIGS. 10A-10D are conceptual diagrams illustrating examples of IBC reference region depending on current coding unit (CU) position.
Figure 10B:
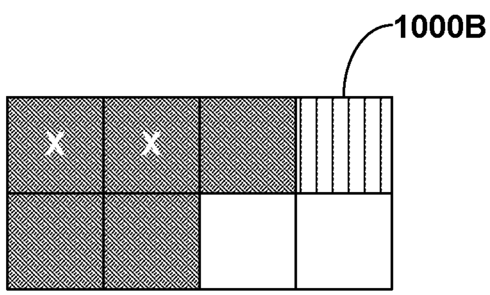
Figure 10C:
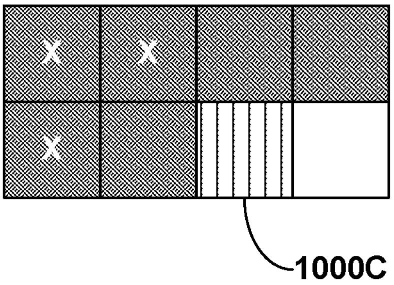
Figure 10D:
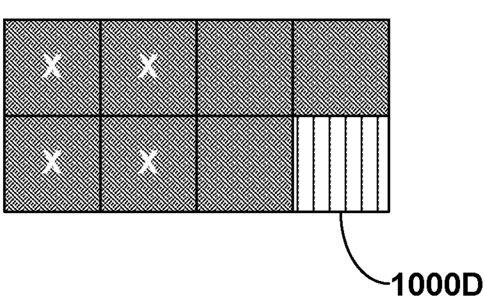

For subblock-based merge candidates with subblock size equal to Wsub×Hsub, the above template comprises several sub-templates with the size of Wsub×1, and the left template comprises several sub-templates with the size of 1×Hsub. As shown in FIG. 9, the motion information of the subblocks in the first row and the first column of current block is used to derive the reference samples of each sub-template. FIG. 9 uses the same reference numerals as FIG. 8 for ease of illustrations.

In the reordering process, a candidate is considered as redundant if the cost difference between a candidate and its predecessor is inferior to a lambda value e.g. |D1-D2|<λ, where D1 and D2 are the costs obtained during the first ARMC ordering and K is the Lagrangian parameter used in the RD criterion at encoder side.

which is equal to five times of the cost of the first MVP candidate, is skipped. In some examples, when wrap around motion compensation is enabled, the MV candidate may be clipped with wrap around offset taken into consideration.

The following describes geometric partitioning mode (GPM) with template matching (TM). Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 2. The motion is then refined by minimizing the difference between the current template and the template in the reference picture using the same search pattern of merge mode with half-pel interpolation filter disabled.

TABLE 2

Template for the 1st and 2nd geometric partitions, where A represents using above samples, L represents using left samples, and L + A represents using both left and above samples.

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| **Partition angle** | **16** | **18** | **19** | **20** | **21** | **24** | **27** | **28** | **29** | **30** |
| 1st partition | A | A | A | A | L + A | L + A | L + A | L + A | A | A |
| 2nd partition | L + A | L + A | L + A | L | L | L | L | L + A | L + A | L + A |

The proposed algorithm is defined as the following:

a. Determine the minimum cost difference between a candidate and its predecessor among all candidates in the list
   i. If the minimum cost difference is superior or equal to λ, the list is considered diverse enough and the reordering stops.
   ii. If this minimum cost difference is inferior to λ, the candidate is considered as redundant and it is moved at a further position in the list. This further position is the first position where the candidate is diverse enough compared to its predecessor.

b. The algorithm stops after a finite number of iterations (if the minimum cost difference is not inferior to λ).

This algorithm is applied to the Regular, TM, BM and Affine merge modes. A similar algorithm is applied to the Merge MMVD and sign MVD prediction methods which also use ARMC for the reordering.

The value of λ is set equal to the λ of the rate distortion criterion used to select the best merge candidate at the encoder side for low delay configuration and to the value λ corresponding to another QP (quantization parameter) for Random Access configuration. A set of λ values corresponding to each signaled QP offset is provided in the SPS (sequence parameter set) or in the Slice Header for the QP offsets which are not present in the SPS.

The following describes extension to AMVP modes. The ARMC design is also applicable to the AMVP mode wherein the AMVP candidates are reordered according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, A GPM candidate list is constructed as follows:

a. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.

b. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

c. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

The following describes intra-block copy (IBC) with template matching. Template Matching is used in IBC for both IBC merge mode and IBC AMVP mode.

The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching method prior to the RDO or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the 2 first ones are then considered in the motion estimation process as usual.

The Template Matching refinement for both IBC-TM merge and AMVP modes is based on IBC motion vectors having constrained (i) to be integer and (ii) within a reference region as shown in FIGS. 10A-10D with current blocks 1000A-1000D. In IBC-TM merge mode, all refinements are performed at integer precision, and in IBC-TM AMVP mode, they are performed either at integer or 4-pel precision depending on the AMVR value. Such a refinement accesses only to samples without interpolation. In both cases, the refined motion vectors and the used template in each refinement step must respect the constraint of the reference region.

There may some issues with template matching. To improve the coding efficiency of template matching, instead of using only one pattern and process of TM, video encoder 200 and video decoder 300 could use different template types (i.e., different template patterns), store more candidates, and apply fusion to combine these different candidates as described in more detail.

The term "template type" and "template pattern" are used interchangeably. Also, the term "candidate" refers to a reference block candidate, where the reference block could potentially be used to generate a prediction block for the current block. In this disclosure, when video encoder 200 or video decoder 300 is described as storing candidates or as storing reference block candidates, such disclosure may be considered as referring to video encoder 200 or video decoder 300 storing information that can be used to identify a reference block candidate. The information that can be used to identify the reference block candidate may be vector information (e.g., x and y-coordinate of a vector into current picture or different picture), coordinate information (e.g., x and y-coordinate of the reference block), etc.

For instance, as described in more detail, video encoder 200 and video decoder 300 may construct a template matching candidate list for a current block of the video data based on a plurality of template patterns. The template matching candidate list may store reference block candidates. That is, in some examples, the template matching candidate list may store information that can be used to identify the reference blocks. The reference block candidates of the template matching candidate list may be identified using a plurality of template patterns. For example, video encoder 200 and video decoder 300 may include a first set of reference block candidates in the template matching candidate list based on a first template pattern of the plurality of template patterns, include a second set of reference block candidates in the template matching candidate list based on a second template pattern of the plurality of template patterns, and so forth. In this way, instead of using only one pattern and process of TM, video encoder 200 and video decoder 300 could use different template types (i.e., different template patterns) and store more candidates (e.g., in the template matching candidate list).

Video encoder 200 and video decoder 300 may encode or decode the current block based on the template matching candidate list. For instance, video encoder 200 may signal and video decoder 300 may receive an index into the template matching candidate list. Video decoder 300 may determine a reference block based on the index, and generate a prediction block. Video encoder 200 may signal and video decoder 300 may receive residual information indicative of a difference between the prediction block and the current block. Video decoder 300 may reconstruct the current block based on the residual information and the prediction block.

Moreover, as described in more detail, in some examples, video encoder 200 and video decoder 300 may determine a plurality of reference blocks (e.g., from the template matching candidate list or from some list). Video encoder 200 and video decoder 300 may fuse (e.g., weighted average) the plurality of reference blocks to generate the prediction block. In this way, instead of using only one pattern and process of TM, video encoder 200 and video decoder 300 could apply fusion to combine these different candidates to generate a prediction block.

The following describes example of multiple TM modes by different template pattern. TM has a template pattern set comprised of multiple template matching patterns. In some examples, a syntax may be signaled to indicate one template pattern used in the template matching process. When template matching is used in the current block and a template matching mode is signaled, the corresponding template pattern of this mode is used in the template matching process.

However, signaling of a syntax element to indicate which template pattern to use is not needed in all examples. For instance, in examples where video encoder 200 and video decoder 300 construct a template matching candidate list based on a plurality of template patterns, as described in more detail, video encoder 200 may signal and video decoder 300 may receive an index into the template matching candidate list.

The template pattern is not constrained to use the adjacent neighboring samples of the current block. For instance, FIGS. 11A-11G are conceptual diagrams illustrating examples of template patterns for respective blocks. That is, FIGS. 11A-11G, with current blocks 1100A-1100G having examples of different template patterns 1102A-1102G, respectively are illustrated. The current blocks are 1100A-100G and the template patterns used in the template matching process is illustrated as 1102A-1102G, respectively.

Template pattern 1102A includes samples in one or more rows above and one or more columns left of the current block or each of the respective reference blocks. In some examples, as illustrated, template pattern 1102A may also includes samples in one or more rows above the current block or each of the respective reference blocks that extend beyond the left boundary of the current block or each of the respective reference blocks, and samples in one or more columns left of the current block or each of the respective reference blocks that extend beyond the upper boundary of the current block or each of the respective reference blocks.

Template pattern 1102B includes only samples in the one or more columns left of the current block or each of the respective reference blocks. Template pattern 1102C includes only samples in the one or more rows above the current block or each of the respective reference blocks. Template pattern 1102D may be a subset of template pattern 1102B, and template pattern 1102E may be a subset of template pattern 1102C. Template pattern 1102F includes samples in one or more columns left of the current block or each of the respective reference blocks that do not neighbor the current block or each of the respective reference blocks. Template pattern 1102G includes samples in one or more rows above the current block or each of the respective reference blocks that do not neighbor the current block or each of the respective reference blocks.

As an example, for a current block, video encoder 200 and video decoder 300 may determine samples of a first template pattern, such as samples of template pattern 1102A around the current block. Using an initial vector (e.g., motion vector or block vector), video encoder 200 and video decoder 300 may identify a first reference block. Video encoder 200 and video decoder 300 may determine samples of the first template pattern around the first reference block. Video encoder 200 and video decoder 300 may determine a template matching cost value for the first reference block. As one example, the template matching cost value may be a SAD between the samples of the first template pattern around the current block and the samples of the first template pattern around the first reference block.

For the current block, video encoder 200 and video decoder 300 may modify the initial vector and identify a second reference block within a search range. Video encoder 200 and video decoder 300 may determine samples of the first template pattern around the second reference block. Video encoder 200 and video decoder 300 may determine a template matching cost value for the second reference block. Video encoder 200 and video decoder 300 may repeat such operations for reference blocks within the search range.

In addition, for the current block, video encoder 200 and video decoder 300 may determine samples of a second template pattern, such as samples of template pattern 1102B around the current block. Video encoder 200 and video decoder 300 may determine respective template matching cost values of respective reference blocks using the second template pattern. Video encoder 200 and video decoder 300 may repeat such techniques for a third template pattern (e.g., template pattern 1102C), and more template patterns, such as template patterns 1102D-1102G.

Video encoder 200 and video decoder 300 may construct the template matching candidate list for the current block based on the respective template matching cost values of the respective reference blocks and the respective template patterns. For example, video encoder 200 and video decoder 300 may include a first set of reference block candidates in the template matching candidate list based on the template cost values calculated using the first template pattern (e.g., arranged from lowest to highest cost). After the first set of reference block candidates, video encoder 200 and video decoder 300 may include a second set of reference block candidates in the template matching candidate list based on the template cost values calculated using the second template pattern (e.g., arranged from lowest to highest cost). After the second set of reference block candidates, video encoder 200 and video decoder 300 may include a third set of reference block candidates in the template matching candidate list based on the template cost values calculated using the third template pattern (e.g., arranged from lowest to highest cost), and so forth.

In one or more examples, constructing the template matching candidate list may be include a coarse step and a refinement step. The above example techniques may be used as part of the coarse step or the refinement step. For instance, the above describes an example of the coarse step in which video encoder 200 and video decoder 300 may determine reference blocks based on modification of a vector. For the refinement step, of the reference blocks that had the lowest template matching cost value, video encoder 200 and video decoder 300 may determine additional reference blocks based on samples that neighbor the top-left corner of the reference blocks. Video encoder 200 and video decoder 300 may perform similar steps as those described above for the additional reference blocks as part of constructing the template matching candidate list. Accordingly, example techniques of determining a template matching cost value for a reference block may be part of the coarse step or the refinement step for constructing a template matching candidate list.

Figure 12A:
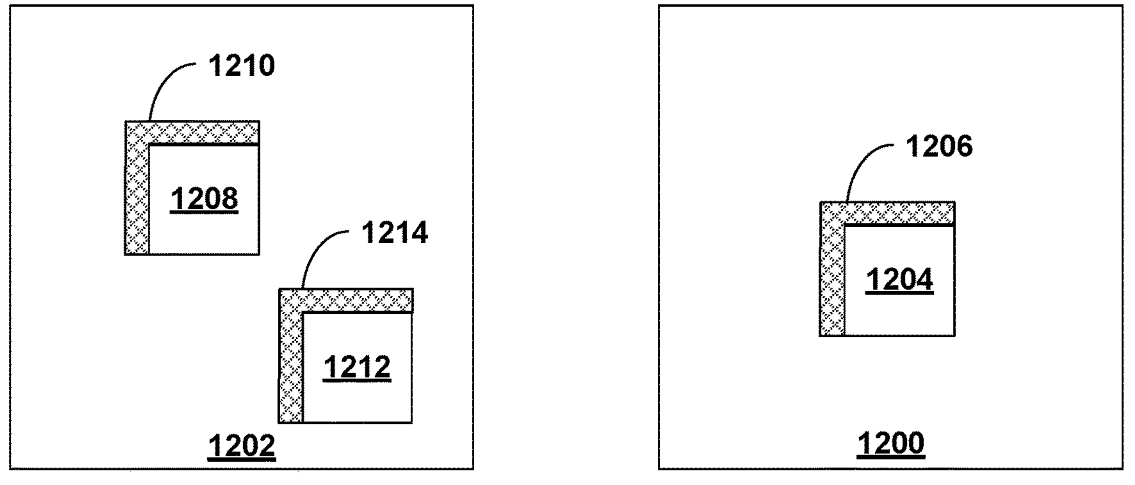
FIGS. 12A-12C are conceptual diagrams illustrating examples of template matching techniques in accordance with one or more examples described in this disclosure.
Figure 12B:
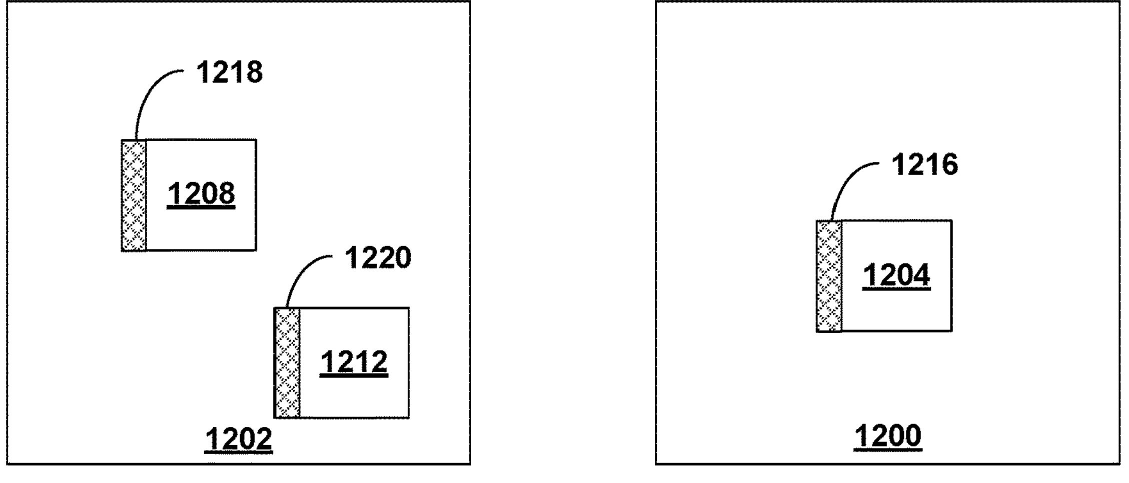
Figure 12C:
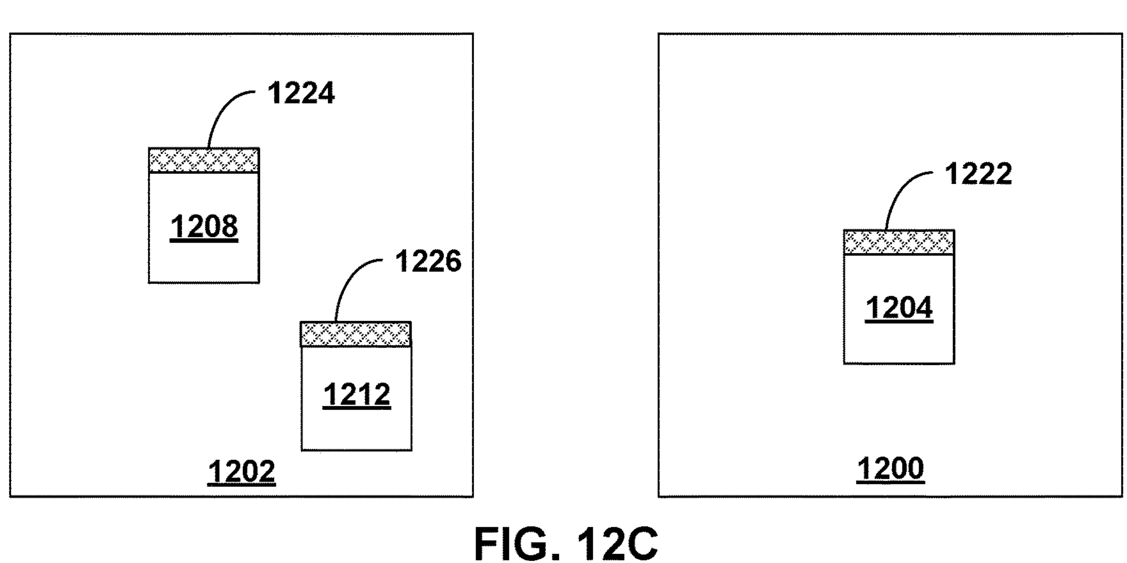

Furthermore, there may be various ways in which video encoder 200 and video decoder 300 may construct the template matching candidate list, as described in more detail with respect to FIGS. 12A-12C. For instance, video encoder 200 and video decoder 300 may maintain separate lists of reference block candidates for each of the template patterns (e.g., one list for template pattern 1102A, one list for template pattern 1102B, one list for template pattern 1102C, and so forth). Video encoder 200 and video decoder 300 may then combine these lists to construct the template matching candidate list. Also, not all template patterns may be used for constructing the template matching candidate list.

In one example, as a simplified method of the above example, the template pattern set is composed of three template matching patterns: (Pattern 1) use both above and left neighboring samples, (Pattern 2) only use above neighboring samples, and (Pattern 3) only use left neighboring samples. The matching cost of template matching pattern 1 is derived from the cost of template matching pattern 2 and the cost of template matching pattern 3.

For example, assume that template pattern 1102A is Pattern 1, template pattern 1102B is Pattern 3, and template pattern 1102C is Pattern 2. One way to determine template matching cost values for a reference block using a plurality of the template patterns would be for video encoder 200 and video decoder 300 to determine a first template matching cost value for a reference block using samples of template pattern 1102A around the reference block and around the current block, determine a second template matching cost value for the reference block using samples of template pattern 1102B around the reference block and around the current block, and determine a third template matching cost value for the reference block using samples of template pattern 1102C around the reference block and around the current block.

Figures 11A, 11B, 11C:
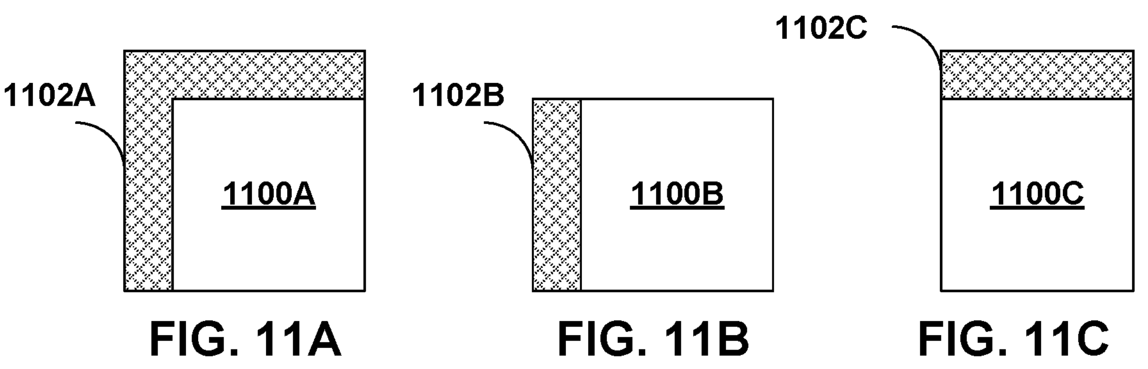
FIGS. 11A-11G are conceptual diagrams illustrating examples of template patterns for respective blocks.
Figures 11D, 11E:
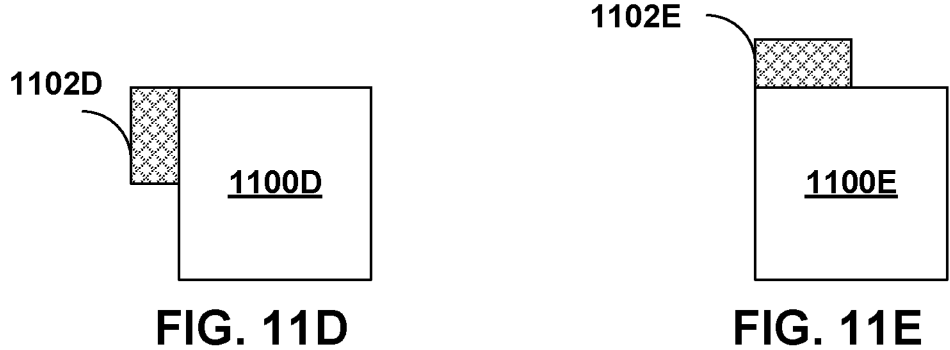
Figures 11F, 11G:
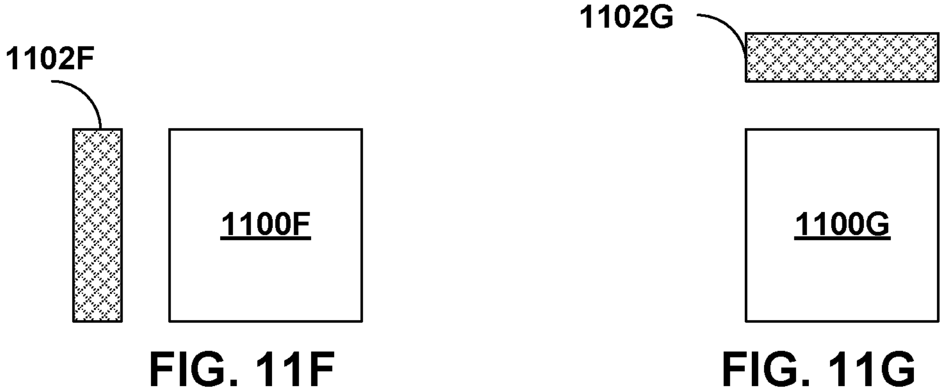

However, as can be seen in FIGS. 11A to 11C, template pattern 1102B overlaps with template pattern 1102A, and template pattern 1102C overlaps with template pattern 1102A. Video encoder 200 and video decoder 300 may exploit this overlapping as a way to reduce computations. For instance, video encoder 200 and video decoder 300 may determine the second template matching cost value for the reference block using samples of template pattern 1102B around the reference block and around the current block, and determine the third template matching cost value for the reference block using samples of template pattern 1102C around the reference block and around the current block.

Video encoder 200 and video decoder 300 may determine the first template matching cost value for the reference block based on the second template matching cost value and the third template matching cost value. For instance, video encoder 200 and video decoder 300 may add, average, weighted average etc. the second template matching cost value and the third template matching cost value to determine an estimate for the first template matching cost value. As another example, video encoder 200 and video decoder 300 may determine a SAD between samples of template pattern 1102A around the reference block and the current block that do not overlap with samples of template pattern 1102B or 1102C. Video encoder 200 and video decoder 300 may add, average, weighted average etc. the determined SAD, the second template matching cost value, and the third template matching cost value to determine the first template matching cost value.

The above describes an example of determining the first template matching cost value for one reference block. As also described above, video encoder 200 and video decoder 300 may be configured to determine template matching cost values for a plurality of reference blocks using different template patterns. In one or more examples, video encoder 200 and video decoder 300 may perform techniques similar to those for each of the respective reference blocks to determine respective first template matching costs. For example, video encoder 200 and video decoder 300 may determine the first respective template matching cost values based at least in part on the determined second respective template matching cost values (e.g., based on the determined second respective template matching cost values and the determined third respective template matching cost values). The first respective template matching cost values may be respective first template cost values of respective reference blocks using the first template pattern (e.g., template pattern 1102A). The second respective template matching cost values may be respective second template cost values of respective reference blocks using the second template pattern (e.g., one of template patterns 1102B or 1102C). The third respective template matching cost values may be respective third template cost values of respective reference blocks using the third template pattern (e.g., other one of template patterns 1102B or 1102C).

The above is described with respect to template patterns 1102A-1102C for ease. The example techniques may be extended to other template patterns including template patterns 1102D-1102G.

In one example, as a simplified method of the above example, the TM has a base template pattern S. The additional template patterns 1 . . . n are all inside the region of S. For example, if FIG. 11A, template pattern 1102A is the base template pattern, FIGS. 11B-11E with template patterns 1102B-1102E could be other template patterns since they are all inside the region of FIG. 11A.

In another example, as a simplified method of the above example, in the template matching cost calculation process, the calculation process always computes the cost of the base template region, and sums up some target regions to get the cost of the used template pattern. In another example, the base template pattern could be the template pattern 1102A. For instance, as described above, in one or more examples, video encoder 200 and video decoder 300 may determine the first respective template matching cost values based at least in part on the determined second respective template matching cost values (e.g., based on the determined second respective template matching cost values and the determined third respective template matching cost values).

In one example, all the template types (e.g., template patterns) can store the best N candidates with the minimum template matching cost, the N is larger than 1 and can be different for different template type. For example, the template pattern A stores $A_1, A_2, \ldots, A_1$, template pattern B stores $B_1, B_2, \ldots, B_j$ and template pattern C stores $C_1, C_2, \ldots, C_k$. This is further illustrated in FIGS. 12A-12C.

FIGS. 12A-12C are conceptual diagrams illustrating examples of template matching techniques in accordance with one or more examples described in this disclosure. FIGS. 12A-12C illustrate current picture 1200 and reference picture 1202 used in inter-prediction techniques. The example techniques would be applicable to intra-prediction or intra-block copy techniques as well.

In FIGS. 12A-12C, video encoder 200 and video decoder 300 may construct a template matching candidate list for current block 1204 of the video data based on a plurality of template patterns. For purposes of illustration, reference blocks 1208 and 1212 are illustrated, which may be reference block candidates whose information is stored in the template matching candidate list (e.g., vector information of vectors that point to reference blocks 1208 and 1212, coordinate information of reference blocks 1208 and 1212, etc.).

In FIG. 12A, video encoder 200 and video decoder 300 may use a first template pattern of the plurality of template patterns (e.g., template pattern 1102A of two or more of template patterns 1102A-1102G). Video encoder 200 and video decoder 300 may determine samples 1206 in accordance with template pattern 1102A around current block 1204. Video encoder 200 and video decoder 300 may determine samples 1210 in accordance with template pattern 1102A around reference block 1208. Video encoder 200 and video decoder 300 may determine a template matching cost value for reference block 1208 based on samples 1206 and 1210 (e.g., SAD value) for the first template pattern.

Similarly, video encoder 200 and video decoder 300 may determine samples 1214 in accordance with template pattern 1102A around reference block 1212. Video encoder 200 and video decoder 300 may determine a template matching cost value for reference block 1212 based on samples 1206 and 1214 (e.g., SAD value) for the first template pattern. Video encoder 200 and video decoder 300 may repeat these steps for reference blocks within reference picture 1202 within a search range to construct a first list of reference block candidates (e.g., $A_1$ to $A_i$ noted above) arranged from lowest temporal matching cost value to greatest temporal matching cost value.

Stated another way, video encoder 200 and video decoder 300 may construct a first list of reference block candidates based on template matching a first template (e.g., samples 1206), having a first template pattern (e.g., template pattern 1102A) of the plurality of template patterns, of the current block 1204 and respective first templates (e.g., samples 1210 and 1214), having the first template pattern, of each of a plurality of reference blocks (e.g., reference blocks 1208 and 1212). To construct the first list of reference block candidates, video encoder 200 and video decoder 300 may determine first respective template matching cost values between the first template and respective templates, having the first template pattern, of each of the plurality of reference blocks (e.g., determine template matching cost value for reference block 1208 and template matching cost value for reference block 1212 using the first template pattern). Video encoder 200 and video decoder 300 may construct the first list of reference block candidates based on the first respective template matching cost values (e.g., ordered least to greatest based on template matching cost values).

In FIG. 12B, video encoder 200 and video decoder 300 may use a second template pattern of the plurality of template patterns (e.g., template pattern 1102B of two or more of template patterns 1102A-1102G). Video encoder 200 and video decoder 300 may determine samples 1216 in accordance with template pattern 1102B around current block 1204. Video encoder 200 and video decoder 300 may determine samples 1218 in accordance with template pattern 1102B around reference block 1208. Video encoder 200 and video decoder 300 may determine a template matching cost value for reference block 1208 based on samples 1216 and 1218 (e.g., SAD value) for the second template pattern.

Similarly, video encoder 200 and video decoder 300 may determine samples 1220 in accordance with template pattern 1102B around reference block 1212. Video encoder 200 and video decoder 300 may determine a template matching cost value for reference block 1212 based on samples 1216 and 1220 (e.g., SAD value) for the second template pattern. Video encoder 200 and video decoder 300 may repeat these steps for reference blocks within reference picture 1202 within a search range to construct a second list of reference block candidates (e.g., $B_1$ to $B_i$ noted above) arranged from lowest temporal matching cost value to greatest temporal matching cost value.

Stated another way, video encoder 200 and video decoder 300 may construct a second list of reference block candidates based on template matching a second template (e.g., samples 1216), having a second template pattern (e.g., template pattern 1102B) of the plurality of template patterns, of the current block 1204 and respective second templates (e.g., samples 1218 and 1220), having the second template pattern, of each of a plurality of reference blocks (e.g., reference blocks 1208 and 1212). To construct the second list of reference block candidates, video encoder 200 and video decoder 300 may determine second respective template matching cost values between the second template and respective templates, having the second template pattern, of each of the plurality of reference blocks (e.g., determine template matching cost value for reference block 1208 and template matching cost value for reference block 1212 using the second template pattern). Video encoder 200 and video decoder 300 may construct the second list of reference block candidates based on the second respective template matching cost values (e.g., ordered least to greatest based on template matching cost values).

In FIG. 12C, video encoder 200 and video decoder 300 may use a third template pattern of the plurality of template patterns (e.g., template pattern 1102C of two or more of template patterns 1102A-1102G). Video encoder 200 and video decoder 300 may determine samples 1222 in accordance with template pattern 1102C around current block 1204. Video encoder 200 and video decoder 300 may determine samples 1224 in accordance with template pattern 1102C around reference block 1208. Video encoder 200 and video decoder 300 may determine a template matching cost value for reference block 1208 based on samples 1222 and 1224 (e.g., SAD value) for the third template pattern.

Similarly, video encoder 200 and video decoder 300 may determine samples 1226 in accordance with template pattern 1102C around reference block 1212. Video encoder 200 and video decoder 300 may determine a template matching cost value for reference block 1212 based on samples 1222 and 1226 (e.g., SAD value) for the third template pattern. Video encoder 200 and video decoder 300 may repeat these steps for reference blocks within reference picture 1202 within a search range to construct a third list of reference block candidates (e.g., $C_1$ to $C_i$ noted above) arranged from lowest temporal matching cost value to greatest temporal matching cost value.

Stated another way, video encoder 200 and video decoder 300 may construct a third list of reference block candidates based on template matching a third template (e.g., samples 1222), having a third template pattern (e.g., template pattern 1102C) of the plurality of template patterns, of the current block 1204 and respective third templates (e.g., samples 1224 and 1226), having the third template pattern, of each of a plurality of reference blocks (e.g., reference blocks 1208 and 1212). To construct the third list of reference block candidates, video encoder 200 and video decoder 300 may determine third respective template matching cost values between the third template and respective templates, having the third template pattern, of each of the plurality of reference blocks (e.g., determine template matching cost value for reference block 1208 and template matching cost value for reference block 1212 using the third template pattern). Video encoder 200 and video decoder 300 may construct the third list of reference block candidates based on the third respective template matching cost values (e.g., ordered least to greatest based on template matching cost values).

Although the above describes determining the first respective template matching cost values based on samples 1206 and samples 1210 and 1214, the example techniques are not so limited. In one or more examples, video encoder 200 and video decoder 300 may determine the second respective template matching cost values from the techniques described with respect to FIG. 12B and determine the third respective template matching cost values from the techniques described with respect to FIG. 12C. Video encoder 200 and video decoder 300 may determine the first respective template matching cost values based at least in part on the second respective template matching cost values and the third respective template matching cost values.

In one or more examples, video encoder 200 and video decoder 300 may construct the template matching candidate list based on the first, second, and third list of reference block candidates described above. For instance, video encoder 200 and video decoder 300 may append the second and third list reference block candidates to the first list of reference block candidates, resulting in the template matching candidate list. As another example, video encoder 200 and video decoder 300 may replace entries in the first list of reference block candidates based on entries in the second and/or third list of reference block candidates to construct the template matching candidate list. In this way, the template matching candidate list may include a first set of reference block candidates in the template matching candidate list based on a first template pattern of the plurality of template patterns, and a second set of reference block candidates in the template matching candidate list based on a second template pattern of the plurality of template patterns.

However, in such appending or replacing, it may be possible that the same reference block candidate is identified multiple times in the template matching candidate list. Accordingly, in one or more examples, video encoder 200 and video decoder 300 may perform a pruning process to avoid the same reference block candidate appearing multiple times in the template matching candidate list. That is, video encoder 200 and video decoder 300 may conduct a pruning process to prevent a redundant candidate when building the template matching candidate list.

For instance, video encoder 200 and video decoder 300 may determine that a reference block candidate in the second list of reference block candidates is not present in the first list of reference block candidates. In this example, video encoder 200 and video decoder 300 may insert the reference block candidate in the second list of reference block candidates into the template matching candidate list. However, in some cases, video encoder 200 and video decoder 300 may determine that a reference block candidate in the second list of reference block candidates is present in the first list of reference block candidates. In this example, video encoder 200 and video decoder 300 may avoid inserting the reference block candidate in the second list of reference block candidates into the template matching candidate list.

The size of the first, second, and third lists of reference block candidates may be different. For instance, the first list of reference block candidates may include X reference block candidates, the second list of reference block candidates may include Y reference block candidates, and the third list of reference block candidates may include Z reference block candidates. In this example, X, Y, and Z may be different numbers, or at least two of X, Y, and Z may be different. For instance, Y and Z may be equal, but different than X.

The above is described with respect to the first, second, and third template patterns, but the example techniques are not so limited. Video encoder 200 and video decoder 300 may perform the example techniques using two template patterns or more than two template patterns.

In one example, if the current block uses TM, video encoder 200 may signal and video decoder 300 may receive another flag to indicate the template pattern of TM, where mode 0 denotes the base template pattern and mode 1 . . . n denote the additional template patterns. In one example, if the current block uses TM and after the template pattern flag is signaled, there is another flag to indicate the candidate index in this template pattern. That is, video encoder 200 may signal and video decoder 300 may receive an index into the template matching candidate list that video decoder 300 uses to determine a prediction block for the current block.

In one example, in TM candidate list construction process, if the distance of the current template matching MV ($x_{cur}$, $y_{cur}$) and an existing candidate MV ($x_{exist}$, $y_{exist}$) is smaller than a threshold, video encoder 200 and video decoder 300 may not insert the current template matching MV (motion vector) into the temporal matching candidate list. In some examples, the distance could be evaluated as the sum of the absolute distances of each MV coordinate elements, ex: $|x_{cur}-x_{exist}|+|y_{cur}-y_{exist}|$. In one example, the threshold may be set dependent on CU size or the number of samples in the CU. In another example, smaller value of threshold should be set if there is larger number of samples in the CU. In one example, in TM candidate list construction process, if the difference of the current template matching block $P_{cur}$ and existing candidate block $P_{exist}$ is smaller than a threshold, video encoder 200 and video decoder 300 may not insert the current template matching MV into the template matching candidate list.

In one example, when constructing the temporal matching candidate list, video encoder 200 and video decoder 300 may sort the reference block candidates based on the temporal matching cost values. That is, the TM cost of the TM candidates from different template patterns is used to sort the order of the candidate list. In one example, when constructing the TM candidate list, the number of available TM candidates can be larger than the capacity of candidate list. For some entry of the list, video encoder 200 and video decoder 300 may select to fill this entry with candidate from different template pattern by a condition or a threshold.

In one example, the condition to fill the candidate list entry is comparing the normalized cost of different candidates. Video encoder 200 and video decoder 300 may compute the normalized cost by dividing the sum of absolute difference by the number of pixels in the template. In one example for normalized cost calculation, the numbers of pixels for different template patterns are set to be the same when comparing the TM costs between candidates using different template patterns. For example, if template patterns a, b and c are used, and template pattern b has the minimum number of samples (e.g., the template size is the smallest) in the template pattern, then the samples in template pattern a and c are subsampled to have the same number of samples with pattern b when comparing the TM costs (i.e., template matching cost values).

In one example, if the current block uses TM and is at the left boundary of the picture, the candidate using only left neighboring samples can be marked invalid and should not be part of the list construction process. Alternatively or additionally, a fixed cost can be assigned to that candidate. In one example, if the current block uses TM and is at the above boundary of the picture, the candidate using only above neighboring samples can be marked invalid and should not be part of the list construction process. Alternatively or additionally, a fixed cost can be assigned to that candidate.

Stated another way, assume that in the above examples, the current block is a first block. Video encoder 200 and video decoder 300 may determine that a second block is along a boundary of a picture. Video encoder 200 and video decoder 300 may construct a second template matching candidate list based on a subset of the plurality of template patterns. The subset of the plurality of template patterns comprise template patterns for which samples outside the boundary are not needed.

In one example, if the current block uses TM and is at the left-above boundary of the picture or the first coding block, the multiple candidate signaling is deactivated. In one example, if the current block uses TM, a template pattern may be deactivated by comparing the CU width and CU height. One example is left template, e.g. template pattern 1102B, is deactivated if the value of CU width is larger than the value of CU height multiplying with a positive threshold. One another example is top template, e.g. template pattern 1102C, is deactivated if the value of CU height is larger than the value of CU width multiplying with a positive threshold. In one example, the syntax of matching pattern is signalled in the CU, PU, CTU, Slice, or picture level.

The following describes examples of fusion of multiple candidates. In fusion, video encoder 200 and video decoder 300 may utilize a plurality of reference block candidates, such as from the template matching candidate list or elsewhere, and fuse the plurality of reference block candidates to form a prediction block for the current block.

For instance, for fusion, video encoder 200 and video decoder 300 may generate the predictor (e.g., prediction block) from a combination of k candidates, the k is larger than 1. The k candidates can be arbitrary selected from the available candidate lists of different template patterns or same pattern. As one example, a 2-candidate fusion can combine the smallest and third smallest cost candidates of template pattern A. For another example, a 3-candidate fusion can combine the second smallest candidate of template pattern A, second smallest candidate of template pattern B and the smallest candidate of template pattern C.

In one example, video encoder 200 and video decoder 300 may generate the predictor (e.g., prediction block) from a combination of k candidates. In one example, a linear combination may be used. The 0 to k candidates could be selected from 0 to N candidates from the template matching candidate list. The combination can be formulated as follows:

$$P_{(x,y)} = \frac{(w_0 * P_{0(x,y)} + w_1 * P_{1(x,y)} + \ldots + w_k * P_{k(x,y)})}{(w_0 + w_1 + \ldots + w_k)}$$

where $P_0 \ldots P_k$ are the selected k candidates derived from TM process (e.g., from the template matching candidate list).

In one example, the combining weight $w_k$ may be derived based on the template matching cost. In one example, it can be the multiplicative inverse of the template matching cost of this candidate k. In one example, the weights are derived based on the SAD, MSE (mean-squared-error), or block vector (BV). In one example, the candidates used in combination can be selected based on the SAD, MSE or block vector (BV) of available candidates.

For example, video encoder 200 and video decoder 300 may determine a plurality of reference block candidates, and fuse the plurality of reference block candidates to generate a prediction block. To fuse the plurality of reference block candidates, video encoder 200 and video decoder 300 may determine a respective weight for each of the plurality of reference block candidates, and fuse the plurality of reference block candidates based on the respective weight for each of the plurality of reference block candidates. As one example, video encoder 200 and video decoder 300 may determine the respective weight for each of the plurality of reference block candidates based on a respective template matching cost value of each of the plurality of reference block candidates (e.g., inverse of the template matching cost value). As one example, video encoder 200 and video decoder 300 may determine the respective weight for each of the plurality of reference block candidates based on a mean-squared-error minimization.

Figure 13:
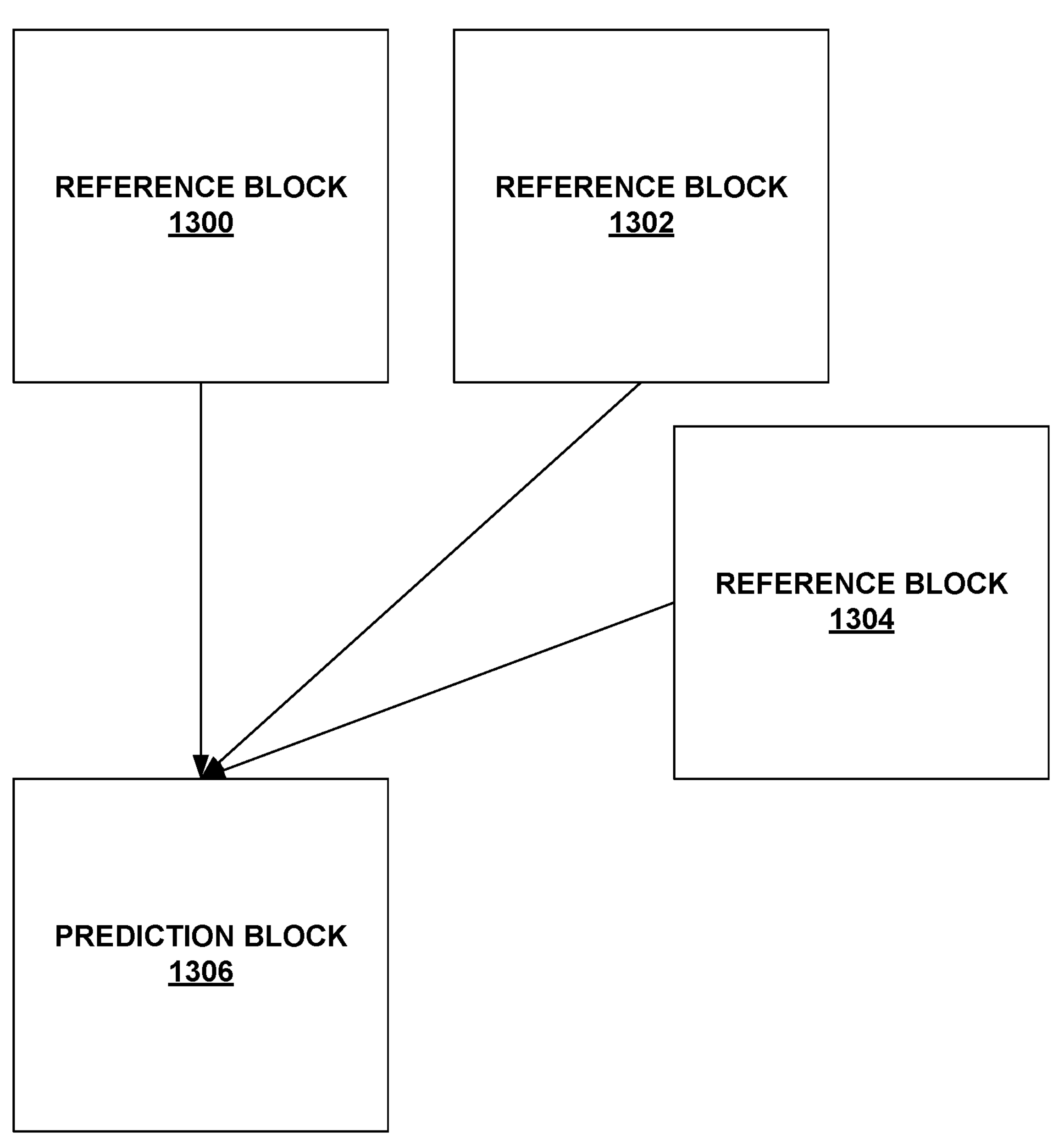
FIG. 13 is a conceptual diagram illustrating example of fusing reference blocks to generate a prediction block.

FIG. 13 is a conceptual diagram illustrating example of fusing reference blocks to generate a prediction block. For instance, FIG. 13 illustrates reference block 1300, reference block 1302, and reference block 1304, which may be identified in the template matching candidate list, or may be from elsewhere. In some examples, video encoder 200 and video decoder 300 may determine a respective template matching cost values for each of reference blocks 1300, 1302, and 1304. Video encoder 200 and video decoder 300 may use any of the template patterns to determine the respective template matching cost values. Video encoder 200 and video decoder 300 may determine a weight for each of reference blocks 1300, 1302, or 1304 based on an inverse of the template matching cost values. This way, reference blocks 1300, 1302, or 1304 having the lowest template matching cost value is given the highest weight, and reference blocks 1300, 1302, or 1304 having the highest template matching cost value is given the lowest weight.

Determining weights based on template matching cost values is one example. As another example, video encoder 200 and video decoder 300 may use mean-squared-error minimization techniques to determine weights. For instance, video encoder 200 and video decoder 300 may use a first sample that is above and left of reference block 1300, a second sample that is above and left of reference block 1302, and a third sample that is above and left of reference block 1304. Video encoder 200 and video decoder 300 may determine a first coefficient, a second coefficient, and a third coefficient, such that when the first coefficient is multiplied by the first sample, the second coefficient is multiplied by the second sample, and the third coefficient is multiplied by the third sample, the result is the sample that is above and left of the current block. Video encoder 200 and video decoder 300 may determine similar coefficients for various samples proximate to reference blocks 1300, 1302, and 1304 and the current block, and use means-squared-error minimization or other regression techniques to determine weights for reference blocks 1300, 1302, and 1304.

Stated another way, in one example, video encoder 200 and video decoder 300 may derive the combining weight $\{w_k\}$ by MSE minimization. In the training phase, the templates of those selected candidates and the template of the current CU are used to derive the weights by MSE minimization. In the fusion phase, the derived weights are used in the linear combination.

The above are two example techniques for determining weights for reference blocks 1300, 1302, and 1304. In one example, video encoder 200 may signal and video decoder 300 may receive a flag to indicate whether the weights derived by the MSE minimization are used in the linear combination. In one example, video encoder 200 may signal and video decoder 300 may receive a flag to indicate whether the weights derived by the MSE minimization or the weights derived by the TM costs are used in the linear combination.

The example techniques should not be considered limited to the above examples. Video encoder 200 and video decoder 300 may perform other techniques, combine above techniques, or combine above techniques and other techniques to determine the weights for reference blocks 1300, 1302, and 1304.

Based on the weights, video encoder 200 and video decoder 300 may fuse reference blocks 1300, 1302, and 1304. For instance, video encoder 200 and video decoder 300 may fuse reference blocks 1300, 1302, and 1304 in accordance with $$P_{(x,y)} = \frac{(w_0 * P_{0(x,y)} + w_1 * P_{1(x,y)} + \ldots + w_k * P_{k(x,y)})}{(w_0 + w_1 + \ldots + w_k)}.$$

The result (e.g., $P_{(x,y)}$) may be prediction block 1306. That is, video encoder 200 and video decoder 300 may use prediction block 1306 to encode or decode the current block.

In one example, there are multiple modes of combination can be selected and signaled. Video encoder 200 and video decoder 300 may construct a fusion list to indicate the candidates of fusion for the current block. That is, video encoder 200 and video decoder 300 may construct a list of fusion candidates (e.g., candidates generated from fusing different reference blocks or using different weights). Video encoder 200 may signal and video decoder 300 may receive an index into the list of fusion candidates to determine the prediction block.

In one example, the number of combination candidates is decided by comparing the cost of the available candidates, if the cost of a candidate is similar to the first fusion candidate, the candidate can be added to the combination. For example, there are 3 available candidates A, B and C, if $cost_B < cost_A * Th$, candidate B can be added to the combination with A, and $cost_C > cost_A * Th$, candidate C will not be added to the combination.

In one example, if the current block uses TM, there is another flag to indicate that whether fusion is applied or not. If fusion is used, another flag is signaled to indicate the index of the fusion list.

In one example, if the current block uses TM, there is another flag to indicate that whether fusion is applied or not. If fusion is used, another flag is signaled to indicate which model of the fusion weighting derivation is used.

In one example, if the current block uses TM, there is another flag to indicate that whether fusion is applied or not. If fusion is not used, the information of the pattern type and pattern index may be signaled. That is, if fusion is not used, then video encoder 200 may signal and video decoder 300 may receive an index into the temporal matching candidate list, and video decoder 300 may determine the prediction block based on the index.

In one example, video encoder 200 may signal and video decoder 300 may receive a flag (e.g., syntax element) to indicate whether the weights derived by the MSE minimization, the weights derived by the TM costs, or other pre-defined weights are used in the linear combination. In one example, whether the weights derived by the MSE minimization are used in the linear combination is implicitly derived based on the index of the selected TM candidate. In one example, whether the weights derived by the MSE minimization are used in the linear combination is implicitly derived based on the size, width, or length of the coding block. In one example, whether the weights derived by the MSE minimization are used in the linear combination is implicitly derived based on the size, width, or length of the template. In one example, whether the weights derived by the MSE minimization are used in the linear combination is implicitly derived base on the number of candidates to be fused.

In one example, in addition to fusing different intra TMP candidates, planar prediction can be additionally fused. Weight of planar prediction can be derived implicitly or signaled explicitly. Whether to use planar prediction for fusion can be decided in an implicit way or by signaling explicitly.

In one example, in addition to fusing different intra TMP candidates, PDPC (prediction dependent prediction combination) prediction can be additionally fused. Weight of PDPC prediction can be derived implicitly or signaled explicitly. Whether to use PDPC prediction for fusion can be decided in an implicit way or by signaling explicitly.

The following describes intraTMP candidate list. A candidate list may be introduced for IntraTMP mode, where the index of the candidate is signaled in a bitstream to indicate how IntraTMP prediction is derived. Alternatively or additionally, the candidate with the smallest cost may be selected from the list without signaled the index. In one example, the cost may be template matching cost.

The above-described methods, and other similar methods, may be used to create various candidates added to the candidate list. A candidate derivation method may be treated as a group, where a certain amount of this group candidates is added to the candidate list to preserve the candidate diversity, as the list has a limited size. The candidates may be added in a predefined order to the list.

For combined candidate, a candidate may be derived by using several candidate derivation methods and such combined candidates may be also added to the list. The candidates already added to the list may be used as an input to the candidate derivation method.

For example, several candidates identified by the smallest template matching cost may be added to the list. Then, for example, the described fusion method may be applied to those already added candidates to the list to derive the fusion candidates which are also added to the list. The fusion method may be applied between the candidates already added to the list and new candidates, for example a fusion with one of the existed candidates in the list and inter/intra or any other prediction method, for example using DIMD (decoder-side intra mode derivation), TIMD (template-based intra mode derivation) methods.

A candidate pruning method may be applied to remove some close candidates. For example, if a candidate is equal to already existed candidate in the list, then such candidate is removed or not added to the list. In another example, if the candidate cost is close to the already existed candidates in the list, then such candidate is removed or not added to the list. In one example, the cost may be the template matching cost.

In the disclosure, template matching cost was used as an example, other methods deriving the candidate cost may be considered as part of this disclosure.

The following describes mixing candidates from TM search and candidates from previously coded blocks. In the aforementioned multiple modes(candidates) for intraTMP, the candidates are derived from the template matching process. In a typical motion vector predictor list (either AMVP mode or merge mode for regular inter prediction mode), it consists of candidates that are derived from previously coded blocks. In one or more examples, the disclosure describes mixing these two types of candidates into one list. The candidates from previously coded block may be from spatial neighbors, non-adjacent neighbors, temporal neighbors from previously coded picture, or it can be history based (wherein previously coded block's block vector is stored in a history table). In one example, the candidates of fusion are derived from the previously coded blocks. In one example, some candidates of fusion are derived from the previously coded block and the other candidates of fusion are derived from the template matching process.

Some constrains may be applied to the candidates derived from previously coded block. For example, the candidate block vector is checked to determine whether it would be redundant or similar to the vector derived from template matching. In one example, the block vector is considered as not valid if it points to the outside of the search area of the template matching. In one example, the block vector is considered as not valid if it points to a position that is one of the candidate positions of the template matching. In one example, the block vector is considered as not valid if it points to a position that is close to one of the candidate positions of the template matching, for example the block vector is within a small window of the candidate position of template matching. In some techniques, instead of considering those candidates as not valid, lower priorities are assigned to those candidates. For example, those candidates are inserted after other candidates, or assigned a penalty term if a cost is used to order the candidates in the list.

Figure 2:
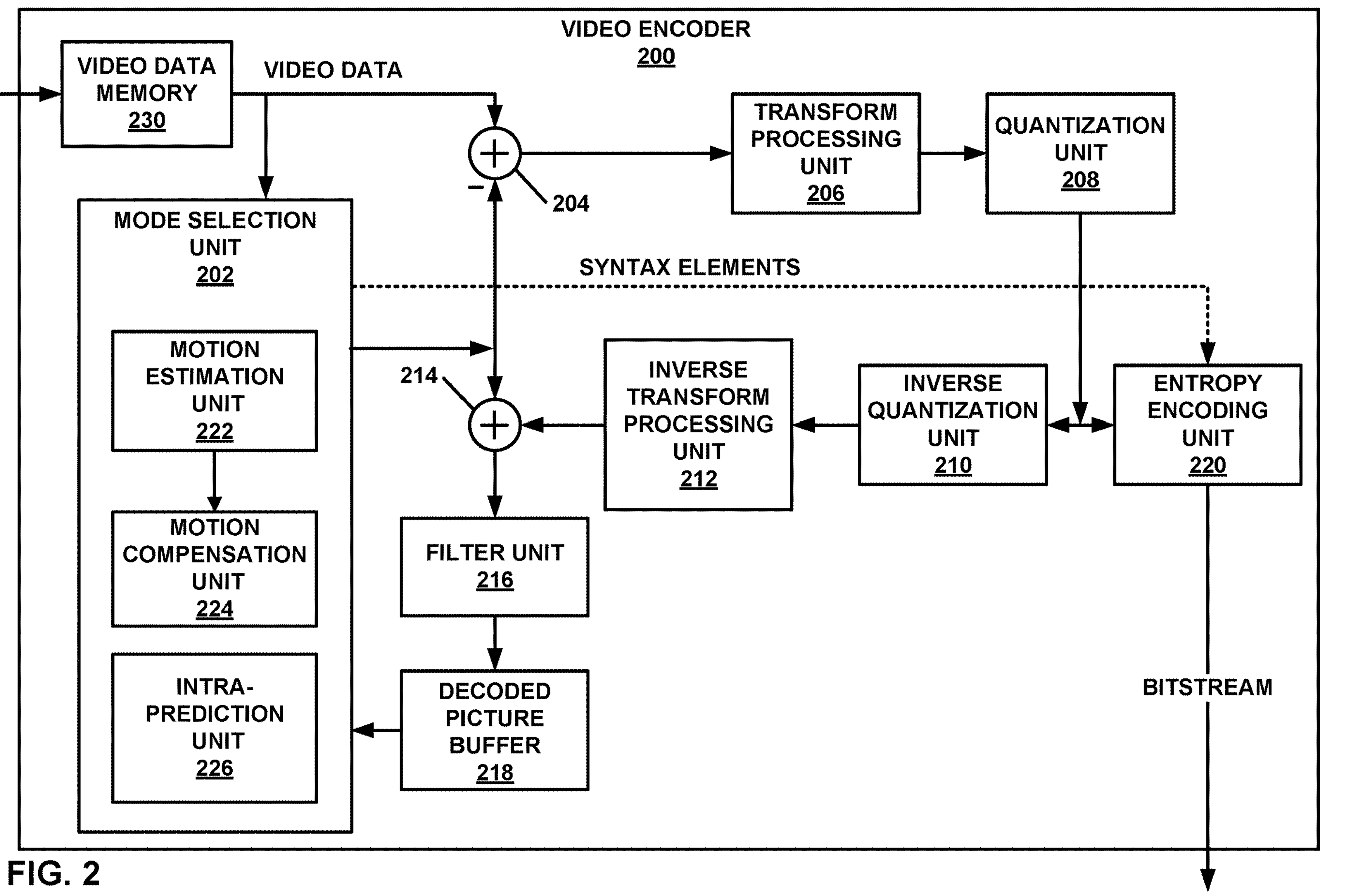
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2NxnU, 2NxnD, nLx2N, and nRx2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to construct a template matching candidate list for a current block of the video data based on a plurality of template patterns, and encode the current block based on the template matching candidate list. In some examples, video encoder 200 may signal an index into the template matching candidate list that video decoder 300 uses for determining a prediction block, and signal residual information indicative of a difference between the prediction block and the current block.

In some examples, video encoder 200 may determine a plurality of reference block candidates, and fuse the plurality of reference block candidates to generate a prediction block. Video encoder 200 may be configured to encode the current block based on the prediction block.

Figure 3:
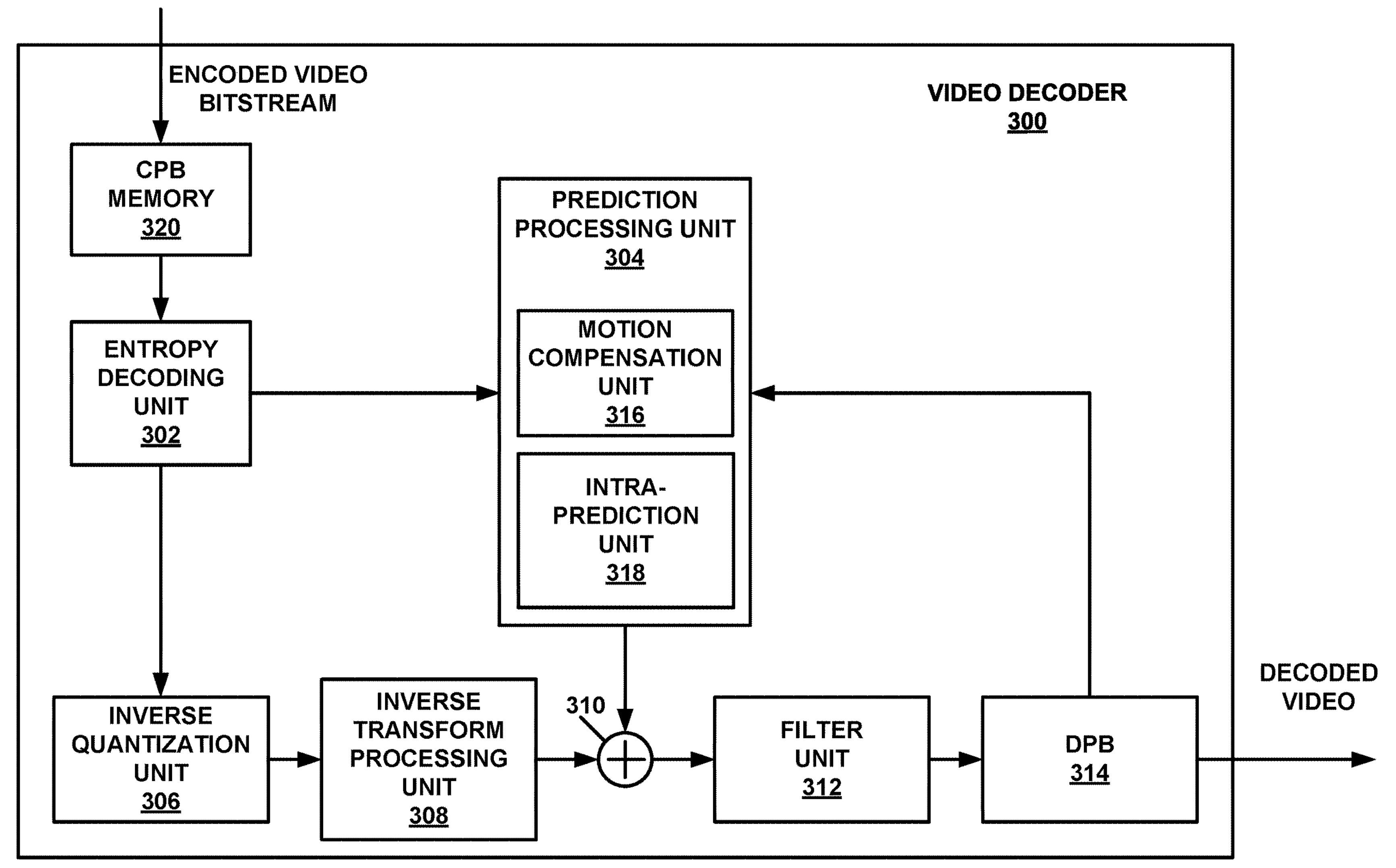
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to construct a template matching candidate list for a current block of the video data based on a plurality of template patterns, and decode the current block based on the template matching candidate list. In some examples, video decoder 300 may receive an index into the template matching candidate list, determine a prediction block based on the index, receive residual information indicative of a difference between the prediction block and the current block, and reconstruct the current block based on the prediction block and the residual information.

In some examples, video decoder 300 may determine a plurality of reference block candidates, and fuse the plurality of reference block candidates to generate a prediction block. Video decoder 300 may be configured to decode the current block based on the prediction block.

Figure 4:
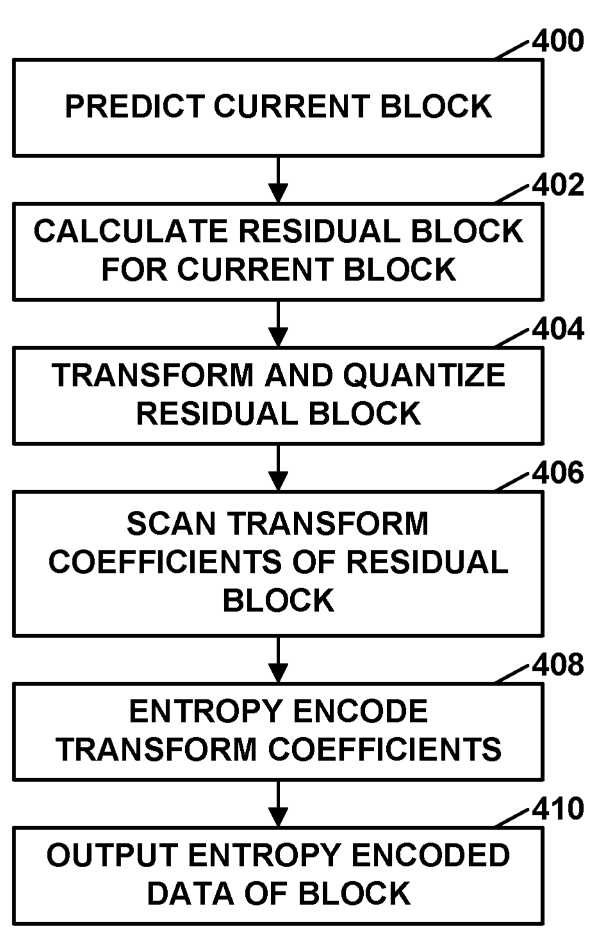
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 5:
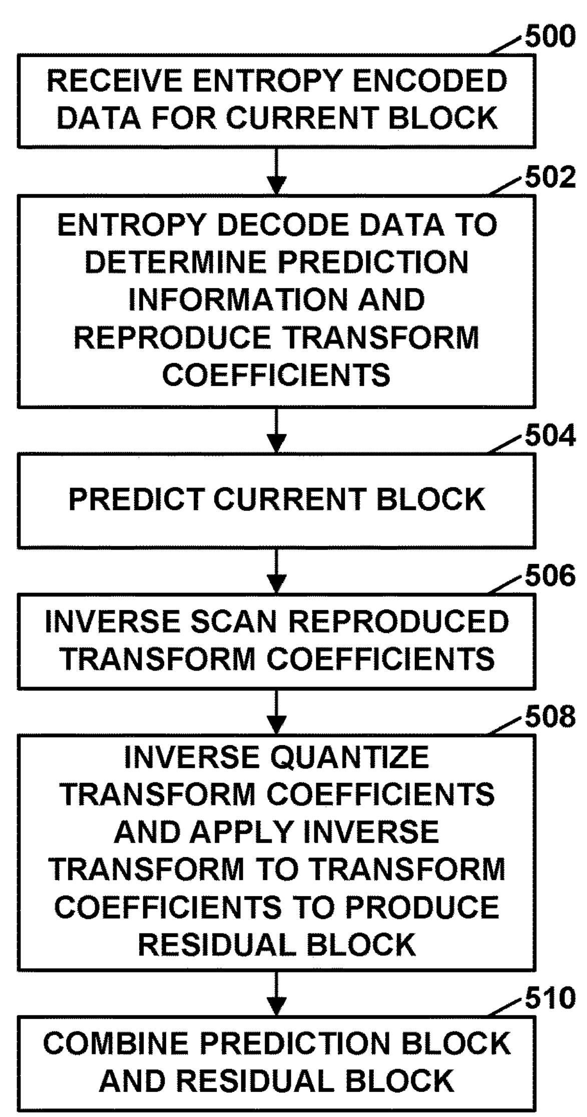
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 14:
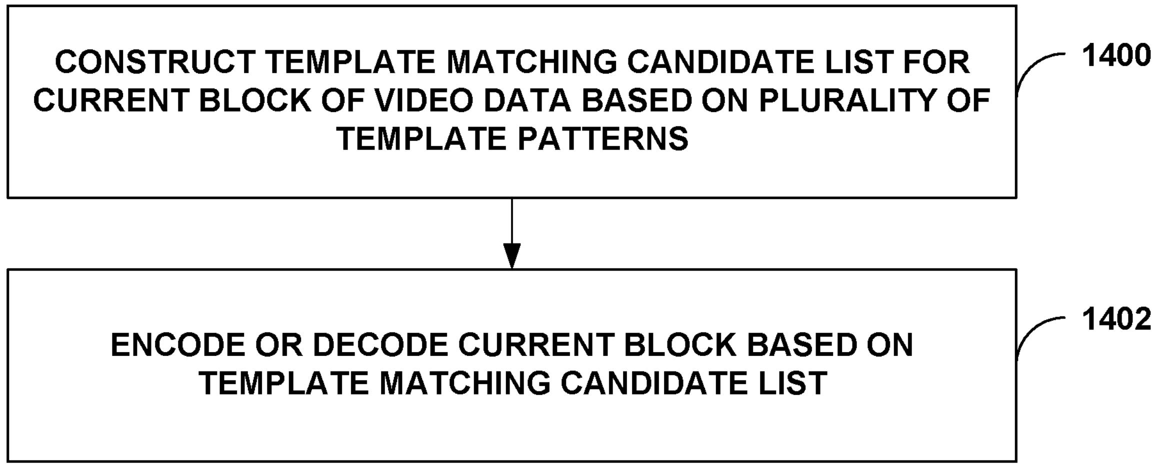
FIG. 14 is a flowchart illustrating an example method of operation in accordance with one or more examples described in this disclosure.

FIG. 14 is a flowchart illustrating an example method of operation in accordance with one or more examples described in this disclosure. Video encoder 200 and video decoder 300 may be configured to construct a template matching candidate list for a current block of the video data based on a plurality of template patterns (1400). Examples of the plurality of template patterns include template patterns 1102A-1102G. In one or more examples, to construct the template matching candidate list for the current block, video encoder 200 and video decoder 300 may include a first set of reference block candidates in the template matching candidate list based on a first template pattern of the plurality of template patterns, and include a second set of reference block candidates in the template matching candidate list based on a second template pattern of the plurality of template patterns. There may be various ways in which to construct the template matching candidate list, such as those described above and with respect to FIG. 15.

Video encoder 200 or video decoder 300 may be configured to encode or decode the current block based on the template matching candidate list (1402). As one example, video encoder 200 and video decoder 300 may perform fusing techniques based on reference blocks identified in the template matching candidate list to generate a prediction block. As one example, video encoder 200 may signal and video decoder 300 may receive an index into the template matching candidate list, and video decoder 300 may determine a prediction block based on the index.

Regardless of the manner in which the prediction block is generated, video encoder 200 may signal and video decoder 300 may receive residual information indicative of a difference between the prediction block and the current block. Video decoder 300 may reconstruct the current block based on the prediction block and the residual information (e.g., add the residual information to the prediction block to reconstruct the current block).

FIG. 15 is another flowchart illustrating an example method of operation in accordance with one or more examples described in this disclosure. FIG. 15 illustrates an example technique for constructing the template matching candidate list.

Video encoder 200 or video decoder 300 may construct a first list of reference block candidates based on template matching a first template of the current block, the first template having a first template pattern of the plurality of template patterns, and respective first templates of each of a plurality of reference blocks, the respective first templates having the first template pattern (1500). That is, video encoder 200 and video decoder 300 may construct a first list of reference block candidates based on template matching a first template, having a first template pattern of the plurality of template patterns, of the current block and respective first templates, having the first template pattern, of each of a plurality of reference blocks. For instance, video encoder 200 and video decoder 300 may perform techniques similar to those described above with respect to FIG. 12A to construct the first list of reference block candidates. As an example, video encoder 200 or video decoder 300 may determine first respective template matching cost values between the first template and respective templates, having the first template pattern, of each of the plurality of reference blocks, and construct the first list of reference block candidates based on the first respective template matching cost values.

Video encoder 200 and video decoder 300 may construct a second list of reference block candidates based on template matching a second template of the current block, the second template having a second template pattern of the plurality of template patterns, and respective second templates of each of the plurality of reference blocks, the respective second templates having the second template pattern (1502). That is, video encoder 200 or video decoder 300 may construct a second list of reference block candidates based on template matching a second template, having a second template pattern of the plurality of template patterns, of the current block and respective second templates, having the second template pattern, of each of the plurality of reference blocks. For instance, video encoder 200 and video decoder 300 may perform techniques similar to those described above with respect to FIG. 12B to construct the second list of reference block candidates. As an example, video encoder 200 or video decoder 300 may determine second respective template matching cost values between the second template and respective templates, having the second template pattern, of each of the plurality of reference blocks, and construct the second list of reference block candidates based on the second respective template matching cost values.

In some examples, video encoder 200 and video decoder 300 may determine the first respective template matching cost values based at least in part on the determined second respective template matching cost values. The first template, having the first template pattern, may include samples in one or more rows above and one or more columns left of the current block (e.g., samples 1206 of FIG. 12A). The second template, having the second template pattern, may include only samples in the one or more rows above the current block (e.g., samples 1222 of FIG. 12C), or only samples in the one or more columns left of the current block (e.g., samples 1216 of FIG. 12B).

Video encoder 200 and video decoder 300 may construct the template matching candidate list based on the first list of reference block candidates and the second list of reference block candidates (1504). In some examples, video encoder 200 and video decoder 300 may construct a third list of reference block candidates based on template matching a third template, having a third template pattern of the plurality of template patterns, of the current block and respective third templates, having the third template pattern, of each of the plurality of reference blocks. Video encoder 200 and video decoder 300 may construct the template matching candidate list based on the first list of reference block candidates, the second list of reference block candidates, and the third list of reference block candidates.

For instance, video encoder 200 and video decoder 300 may append the second and/or third list of reference block candidates to the first list of reference block candidates to construct the template matching candidate list. As another example, video encoder 200 and video decoder 300 may replace entries in the first list of reference block candidates based on entries in the second and/or third list of reference block candidates to construct the template matching candidate list. In some examples, video encoder 200 and video decoder 300 may perform a pruning to avoid duplicate entries in the template matching candidate list. For example, video encoder 200 and video decoder 300 may determine that a reference block candidate in the second list of reference block candidates is not present in the first list of reference block candidates. In this case, video encoder 200 and video decoder 300 may insert the reference block candidate in the second list of reference block candidates into the template matching candidate list. As another example, video encoder 200 and video decoder 300 may determine that a reference block candidate in the second list of reference block candidates is present in the first list of reference block candidates. In this case, video encoder 200 and video decoder 300 may avoid inserting the reference block candidate in the second list of reference block candidates into the template matching candidate list.

Figure 16:
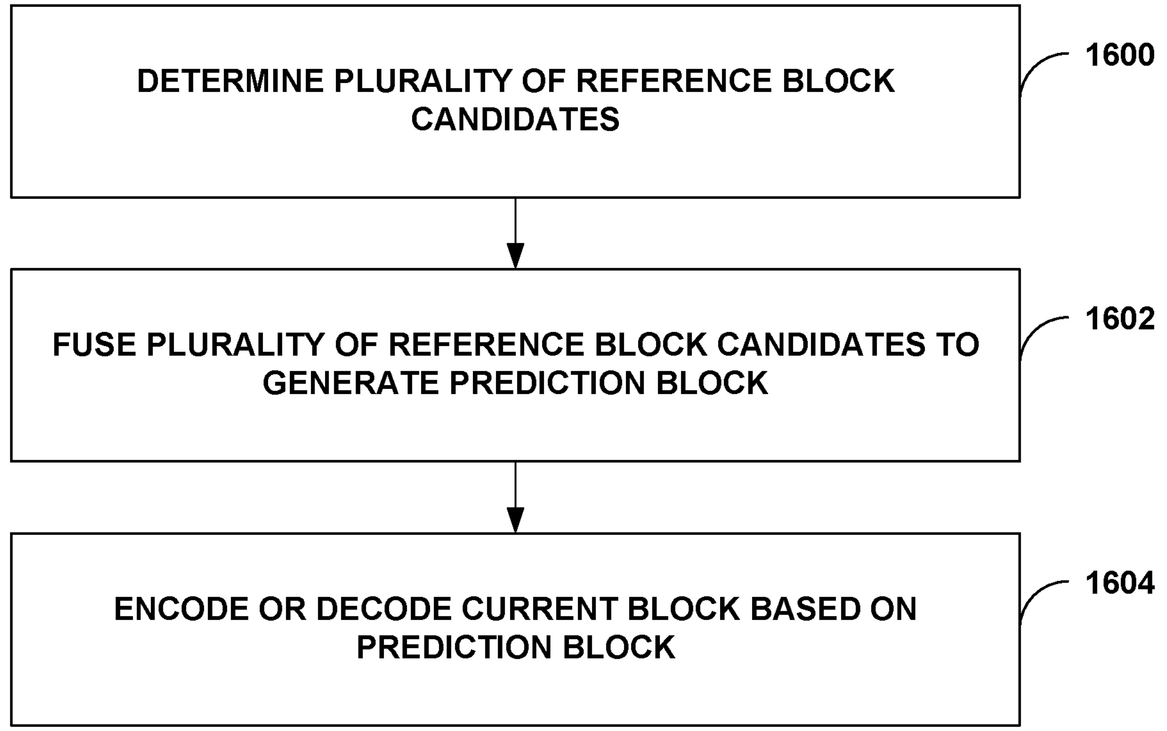
FIG. 16 is another flowchart illustrating an example method of operation in accordance with one or more examples described in this disclosure.

FIG. 16 is another flowchart illustrating an example method of operation in accordance with one or more examples described in this disclosure. FIG. 16 illustrates example techniques for generating a prediction block based on fusion techniques.

Video encoder 200 and video decoder 300 may determine a plurality of reference block candidates (1600). In some examples, video encoder 200 and video decoder 300 may determine the plurality of reference block candidates from the template matching candidate list, from one or more of the first list of reference block candidates, the second list of reference block candidates, and the third list of reference block candidates, or some other way. Video encoder 200 and video decoder 300 may utilize implicit or signaling techniques to determine the plurality of reference block candidates.

Video encoder 200 and video decoder 300 may fuse the plurality of reference block candidates to generate a prediction block (1602). For example, to fuse the plurality of reference block candidates, video encoder 200 and video decoder 300 may determine a respective weight for each of the plurality of reference block candidates, and fuse the plurality of reference block candidates based on the respective weight for each of the plurality of reference block candidates. As one example, video encoder 200 and video decoder 300 may determine the respective weight for each of the plurality of reference block candidates based on a respective template matching cost value of each of the plurality of reference block candidates. As one example, video encoder 200 and video decoder 300 may determine the respective weight for each of the plurality of reference block candidates based on a mean-squared-error minimization.

Video encoder 200 and video decoder 300 may encode or decode the current block based on the prediction block (1604). For example, video encoder 200 may signal and video decoder 300 may receive residual information indicative of a difference between the prediction block and the current block. Video decoder 300 may reconstruct the current block based on the prediction block and the residual information (e.g., add the residual information and the prediction block).

The following numbered clauses illustrate one or more aspects of the devices and techniques described in this disclosure.

Clause 1A. A method of encoding or decoding video data, the method comprising: determining a template pattern from a plurality of template patterns for a current block of the video data; and encoding or decoding the current block, wherein encoding or decoding includes performing template matching based on the template pattern.

Clause 2A. The method of clause 1A, wherein performing the template matching based on the template pattern comprises at least one of: intra-template matching for intra-prediction of the current block based on the template pattern; inter-template matching for inter-prediction of the current block based on the template pattern; adaptive reordering of merge candidates with template matching for inter-prediction of the current block based on the template pattern; or intra-block copy template matching for inter-block prediction of the current block based on the template pattern.

Clause 3A. The method of any of clauses 1A and 2A, wherein determining the template pattern comprises receiving information indicative of a template matching mode, the template matching mode corresponding to the template pattern.

Clause 4A. The method of any of clauses 1A-3A, wherein the plurality of template patterns includes at least on template pattern including samples that is not adjacent to samples of the current block.

Clause 5A. The method of any of clauses 1A-4A, wherein the plurality of template patterns includes a base template pattern, and wherein one or more of the plurality of template patterns includes samples that are inside the base template pattern.

Clause 6A. The method of any of clauses 1A-5A, wherein determining the template pattern comprises determining a first template pattern, the method further comprising: determining a second template pattern; and fusing the first template pattern and the second template pattern to generate a combined template pattern, wherein encoding or decoding comprises encoding or decoding the current block such as performing template matching based on the combined template pattern.

Clause 7A. A device for encoding or decoding video data, the device comprising: memory configured to store the video data; and processing circuitry configured to perform the method of any of clauses 1A-6A.

Clause 8A. The device of clause 7A, further comprising a display configured to display the video data after decoding.

Clause 9A. The device of any of clauses 7A and 8A, wherein the device comprises one or more of a camera, a computer, a mobile device, a broadcast receiver device, or a set-top box.

Clause 10A. A computer-readable storage medium having stored thereon instructions that, when executed, cause one or more processors to perform the method of any of clauses 1A-6A.

Clause 11A. A device for encoding or decoding video data, the device comprising means for performing the method of any of clauses 1A-6A.

Clause 1. A method of encoding or decoding video data, the method comprising: constructing a template matching candidate list for a current block of the video data based on a plurality of template patterns; and encoding or decoding the current block based on the template matching candidate list.

Clause 2. The method of clause 1, wherein constructing the template matching candidate list for the current block comprises: including a first set of reference block candidates in the template matching candidate list based on a first template pattern of the plurality of template patterns; and including a second set of reference block candidates in the template matching candidate list based on a second template pattern of the plurality of template patterns.

Clause 3. The method of clauses 1 and 2, wherein constructing the template matching candidate list comprises: constructing a first list of reference block candidates based on template matching a first template of the current block, the first template having a first template pattern of the plurality of template patterns, and respective first templates of each of a plurality of reference blocks, the respective first templates having the first template pattern; constructing a second list of reference block candidates based on template matching a second template of the current block, the second template having a second template pattern of the plurality of template patterns, and respective second templates of each of the plurality of reference blocks, the respective second templates having the second template pattern; and constructing the template matching candidate list based on the first list of reference block candidates and the second list of reference block candidates.

Clause 4. The method of clause 3, further comprising: constructing a third list of reference block candidates based on template matching a third template, having a third template pattern of the plurality of template patterns, of the current block and respective third templates, having the third template pattern, of each of the plurality of reference blocks, wherein constructing the template matching candidate list comprises constructing the template matching candidate list based on the first list of reference block candidates, the second list of reference block candidates, and the third list of reference block candidates.

Clause 5. The method of any of clauses 3 and 4, wherein the first template, having the first template pattern, comprises samples in one or more rows above and one or more columns left of the current block, and wherein the second template, having the second template pattern, comprises one of: only samples in the one or more rows above the current block, or only samples in the one or more columns left of the current block.

Clause 6. The method of any of clauses 3-5, wherein constructing the template matching candidate list comprises: determining that a reference block candidate in the second list of reference block candidates is not present in the first list of reference block candidates; and inserting the reference block candidate in the second list of reference block candidates into the template matching candidate list.

Clause 7. The method of any of clauses 3-6, wherein constructing the template matching candidate list comprises: determining that a reference block candidate in the second list of reference block candidates is present in the first list of reference block candidates; and avoiding inserting the reference block candidate in the second list of reference block candidates into the template matching candidate list.

Clause 8. The method of any of clauses 3-7, wherein constructing the first list of reference block candidates comprises: determining first respective template matching cost values between the first template and respective templates of each of the plurality of reference blocks; and constructing the first list of reference block candidates based on the first respective template matching cost values, wherein constructing the second list of reference block candidates comprises: determining second respective template matching cost values between the second template and respective templates of each of the plurality of reference blocks; and constructing the second list of reference block candidates based on the second respective template matching cost values.

Clause 9. The method of clause 8, wherein determining the first respective template matching cost values comprises determining the first respective template matching cost values based at least in part on the determined second respective template matching cost values.

Clause 10. The method of any of clauses 1-9, wherein the current block comprises a first block, and wherein the template matching candidate list is a first template matching candidate list, the method further comprising: determining that a second block is along a boundary of a picture; constructing a second template matching candidate list based on a subset of the plurality of template patterns, wherein the subset of the plurality of template patterns comprise template patterns for which samples outside the boundary are not needed; and encoding or decoding the second block based on the second template matching candidate list.

Clause 11. The method of any of clauses 1-10, further comprising: determining a plurality of reference block candidates; and fusing the plurality of reference block candidates to generate a prediction block, wherein encoding or decoding the current block comprises encoding or decoding the current block based on the prediction block.

Clause 12. The method of clause 11, wherein fusing the plurality of reference block candidates comprises: determining a respective weight for each of the plurality of reference block candidates; and fusing the plurality of reference block candidates based on the respective weight for each of the plurality of reference block candidates.

Clause 13. The method of clause 12, wherein determining the respective weight comprises determining the respective weight for each of the plurality of reference block candidates based on a respective template matching cost value of each of the plurality of reference block candidates.

Clause 14. The method of any of clauses 12 and 13, wherein determining the respective weight comprises determining the respective weight for each of the plurality of reference block candidates based on a mean-squared-error minimization.

Clause 15. The method of any of clauses 1-14, wherein encoding or decoding the current block based on the template matching candidate list comprises decoding the current block based on the template matching candidate list, wherein decoding the current block comprises: receiving an index into the template matching candidate list; determining a prediction block based on the index; receiving residual information indicative of a difference between the prediction block and the current block; and reconstructing the current block based on the prediction block and the residual information.

Clause 16. The method of any of clauses 1-14, wherein encoding or decoding the current block based on the template matching candidate list comprises encoding the current block based on the template matching candidate list, wherein encoding the current block comprises: signaling an index into the template matching candidate list that a video decoder uses for determining a prediction block; and signaling residual information indicative of a difference between the prediction block and the current block.

Clause 17. A device for encoding or decoding video data, the device comprising: one or more memories configured to store the video data; and processing circuitry coupled to the one or more memories, wherein the processing circuitry is configured to: construct a template matching candidate list for a current block of the video data based on a plurality of template patterns; and encode or decode the current block based on the template matching candidate list.

Clause 18. The device of clause 17, wherein to construct the template matching candidate list, the processing circuitry is configured to: construct a first list of reference block candidates based on template matching a first template of the current block, the first template having a first template pattern of the plurality of template patterns, and respective first templates of each of a plurality of reference blocks, the respective first templates having the first template pattern; construct a second list of reference block candidates based on template matching a second template of the current block, the second template having a second template pattern of the plurality of template patterns, and respective second templates of each of the plurality of reference blocks, the respective second templates having the second template pattern; and construct the template matching candidate list based on the first list of reference block candidates and the second list of reference block candidates.

Clause 19. The device of any of clauses 17 and 18, wherein the processing circuitry is configured to: determine a plurality of reference block candidates; and fuse the plurality of reference block candidates to generate a prediction block, wherein to encode or decode the current block, the processing circuitry is configured to encode or decode the current block based on the prediction block.

Clause 20. A computer-readable storage medium storing instructions thereon that when executed cause one or more processors to: construct a template matching candidate list for a current block of video data based on a plurality of template patterns; and encode or decode the current block based on the template matching candidate list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:

constructing a template matching candidate list for a current block of the video data based on a plurality of template patterns comprising:

including a first set of reference block candidates in the template matching candidate list based on a first template pattern of the plurality of template patterns; and including a second set of reference block candidates in the template matching candidate list based on a second template pattern of the plurality of template patterns; and encoding or decoding the current block based on the template matching candidate list.

2. The method of claim 1, wherein constructing the template matching candidate list comprises:

constructing a first list of reference block candidates based on template matching a first template of the current block, the first template having a first template pattern of the plurality of template patterns, and respective first templates of each of a plurality of reference blocks, the respective first templates having the first template pattern;

constructing a second list of reference block candidates based on template matching a second template of the current block, the second template having a second template pattern of the plurality of template patterns, and respective second templates of each of the plurality of reference blocks, the respective second templates having the second template pattern; and constructing the template matching candidate list based on the first list of reference block candidates and the second list of reference block candidates.

3. The method of claim 2, further comprising:

constructing a third list of reference block candidates based on template matching a third template, having a third template pattern of the plurality of template patterns, of the current block and respective third templates, having the third template pattern, of each of the plurality of reference blocks, wherein constructing the template matching candidate list comprises constructing the template matching candidate list based on the first list of reference block candidates, the second list of reference block candidates, and the third list of reference block candidates.

4. The method of claim 2, wherein the first template, having the first template pattern, comprises samples in one or more rows above and one or more columns left of the current block, and wherein the second template, having the second template pattern, comprises one of:

only samples in the one or more rows above the current block, or only samples in the one or more columns left of the current block.

5. The method of claim 2, wherein constructing the template matching candidate list comprises:

determining that a reference block candidate in the second list of reference block candidates is not present in the first list of reference block candidates; and inserting the reference block candidate in the second list of reference block candidates into the template matching candidate list.

6. The method of claim 2, wherein constructing the template matching candidate list comprises:

determining that a reference block candidate in the second list of reference block candidates is present in the first list of reference block candidates; and avoiding inserting the reference block candidate in the second list of reference block candidates into the template matching candidate list.

7. The method of claim 2, wherein constructing the first list of reference block candidates comprises:

determining first respective template matching cost values between the first template and respective templates of each of the plurality of reference blocks; and constructing the first list of reference block candidates based on the first respective template matching cost values, wherein constructing the second list of reference block candidates comprises:

determining second respective template matching cost values between the second template and respective templates of each of the plurality of reference blocks; and constructing the second list of reference block candidates based on the second respective template matching cost values.

8. The method of claim 7, wherein determining the first respective template matching cost values comprises determining the first respective template matching cost values based at least in part on the determined second respective template matching cost values.

9. The method of claim 1, wherein the current block comprises a first block, and wherein the template matching candidate list is a first template matching candidate list, the method further comprising:

determining that a second block is along a boundary of a picture;

constructing a second template matching candidate list based on a subset of the plurality of template patterns, wherein the subset of the plurality of template patterns comprise template patterns for which samples outside the boundary are not needed; and encoding or decoding the second block based on the second template matching candidate list.

10. The method of claim 1, further comprising:

determining a plurality of reference block candidates; and fusing the plurality of reference block candidates to generate a prediction block, wherein encoding or decoding the current block comprises encoding or decoding the current block based on the prediction block.

11. The method of claim 10, wherein fusing the plurality of reference block candidates comprises:

determining a respective weight for each of the plurality of reference block candidates; and fusing the plurality of reference block candidates based on the respective weight for each of the plurality of reference block candidates.

12. The method of claim 11, wherein determining the respective weight comprises determining the respective weight for each of the plurality of reference block candidates based on a respective template matching cost value of each of the plurality of reference block candidates.

13. The method of claim 11, wherein determining the respective weight comprises determining the respective weight for each of the plurality of reference block candidates based on a mean-squared-error minimization.

14. The method of claim 1, wherein encoding or decoding the current block based on the template matching candidate list comprises decoding the current block based on the template matching candidate list, wherein decoding the current block comprises:

receiving an index into the template matching candidate list;

determining a prediction block based on the index;

receiving residual information indicative of a difference between the prediction block and the current block; and reconstructing the current block based on the prediction block and the residual information.

15. The method of claim 1, wherein encoding or decoding the current block based on the template matching candidate list comprises encoding the current block based on the template matching candidate list, wherein encoding the current block comprises:

signaling an index into the template matching candidate list that a video decoder uses for determining a prediction block; and signaling residual information indicative of a difference between the prediction block and the current block.

16. A device for encoding or decoding video data, the device comprising:

one or more memories configured to store the video data; and processing circuitry coupled to the one or more memories, wherein the processing circuitry is configured to:

construct a template matching candidate list for a current block of the video data based on a plurality of template patterns, wherein to construct the template matching candidate list, the processing circuitry is configured to:

include a first set of reference block candidates in the template matching candidate list based on a first template pattern of the plurality of template patterns; and include a second set of reference block candidates in the template matching candidate list based on a second template pattern of the plurality of template patterns; and encode or decode the current block based on the template matching candidate list.

17. The device of claim 16, wherein to construct the template matching candidate list, the processing circuitry is configured to:

construct a first list of reference block candidates based on template matching a first template of the current block, the first template having a first template pattern of the plurality of template patterns, and respective first templates of each of a plurality of reference blocks, the respective first templates having the first template pattern;

construct a second list of reference block candidates based on template matching a second template of the current block, the second template having a second template pattern of the plurality of template patterns, and respective second templates of each of the plurality of reference blocks, the respective second templates having the second template pattern; and construct the template matching candidate list based on the first list of reference block candidates and the second list of reference block candidates.

18. The device of claim 16, wherein the processing circuitry is configured to:

determine a plurality of reference block candidates; and fuse the plurality of reference block candidates to generate a prediction block, wherein to encode or decode the current block, the processing circuitry is configured to encode or decode the current block based on the prediction block.

19. A non-transitory computer-readable storage medium storing instructions thereon that when executed cause one or more processors to:

construct a template matching candidate list for a current block of video data based on a plurality of template patterns, wherein to construct the template matching candidate list, the instructions further cause the one or more processors to:

include a first set of reference block candidates in the template matching candidate list based on a first template pattern of the plurality of template patterns; and include a second set of reference block candidates in the template matching candidate list based on a second template pattern of the plurality of template patterns; and encode or decode the current block based on the template matching candidate list.

* * * * *